US010315508B2

(12) United States Patent
Yoshida et al.

(10) Patent No.: US 10,315,508 B2
(45) Date of Patent: Jun. 11, 2019

(54) HYBRID WORK MACHINE

(71) Applicant: Hitachi Construction Machinery Tierra Co., Ltd., Koka-shi, Shiga (JP)

(72) Inventors: Hajime Yoshida, Omihachiman (JP); Shuuhei Noguchi, Higashiomi (JP)

(73) Assignee: Hitachi Construction Machinery Tierra Co., Ltd, Koka-shi (JP)

( * ) Notice: Subject to any disclaimer, the term of this patent is extended or adjusted under 35 U.S.C. 154(b) by 138 days.

(21) Appl. No.: 15/506,192

(22) PCT Filed: Nov. 25, 2015

(86) PCT No.: PCT/JP2015/083130
§ 371 (c)(1),
(2) Date: Feb. 23, 2017

(87) PCT Pub. No.: WO2016/139852
PCT Pub. Date: Sep. 9, 2016

(65) Prior Publication Data
US 2017/0274755 A1    Sep. 28, 2017

(30) Foreign Application Priority Data

Mar. 2, 2015  (JP) .................................. 2015-040737

(51) Int. Cl.
*B60W 20/00*    (2016.01)
*B60K 6/485*    (2007.10)
(Continued)

(52) U.S. Cl.
CPC ................ *B60K 6/485* (2013.01); *B60K 6/46* (2013.01); *B60L 50/16* (2019.02); *B60L 50/50* (2019.02);
(Continued)

(58) Field of Classification Search
CPC .......... B60K 6/485; E02F 9/2246; E02F 9/22; B60L 11/18; B60W 10/06; B60W 10/08;
(Continued)

(56) References Cited

U.S. PATENT DOCUMENTS 6,183,210 B1 * 2/2001 Nakamura ............ E02F 9/2235
    417/222.1
7,086,226 B2 * 8/2006 Oguri .................... E02F 9/2075
    60/414
(Continued)

FOREIGN PATENT DOCUMENTS

JP    2002-275945 A    9/2002
JP    2005-83242 A     3/2005
(Continued)

OTHER PUBLICATIONS

International Search Report (PCT/ISA/210) issued in PCT Application No. PCT/JP2015/083130 dated Feb. 23, 2016 with English translation (seven pages).
(Continued)

*Primary Examiner* — James A Shriver, II
*Assistant Examiner* — Steve Clemmons
(74) *Attorney, Agent, or Firm* — Crowell & Moring LLP

(57) ABSTRACT

Provided is a hybrid work machine in which a hybrid system and a downsized engine are used. The hybrid work machine performs rapid charging of a power storage device while preventing decreases in the output power of a hydraulic pump. A vehicle body controller performs engine revolution speed decreasing control in which, if the charge rate of a battery becomes equal to or less than a minimum charge rate, the target revolution speed of an engine is reduced. The vehicle body controller also performs torque reducing control in which the maximum absorption torque of a hydraulic pump is reduced. By performing these control operations,
(Continued)

the vehicle body controller coercively generates surplus torque for the engine and operates a generator-motor as a generator.

3 Claims, 22 Drawing Sheets

(51) Int. Cl.

| | |
|---|---|
| *B60W 10/06* | (2006.01) |
| *B60W 10/08* | (2006.01) |
| *B60W 10/26* | (2006.01) |
| *F02D 29/00* | (2006.01) |
| *F02D 29/04* | (2006.01) |
| *F02D 29/06* | (2006.01) |
| *B60W 10/30* | (2006.01) |
| *E02F 9/22* | (2006.01) |
| *E02F 9/20* | (2006.01) |
| *F02D 41/24* | (2006.01) |
| *F02D 41/30* | (2006.01) |
| *F02D 43/04* | (2006.01) |
| *B60K 6/46* | (2007.10) |
| *B60W 30/188* | (2012.01) |
| *B60W 20/40* | (2016.01) |
| *B60W 20/13* | (2016.01) |
| *B60L 50/50* | (2019.01) |
| *B60L 50/16* | (2019.01) |

(52) U.S. Cl.
CPC ............ *B60W 10/06* (2013.01); *B60W 10/08* (2013.01); *B60W 10/26* (2013.01); *B60W 10/30* (2013.01); *B60W 20/00* (2013.01); *B60W 20/13* (2016.01); *B60W 20/40* (2013.01); *B60W 30/1888* (2013.01); *E02F 9/2091* (2013.01); *E02F 9/22* (2013.01); *E02F 9/2246* (2013.01); *F02D 29/00* (2013.01); *F02D 29/04* (2013.01); *F02D 29/06* (2013.01); *F02D 41/2422* (2013.01); *F02D 41/3005* (2013.01); *F02D 43/04* (2013.01); *B60W 2300/17* (2013.01); *B60W 2510/244* (2013.01); *B60W 2710/0661* (2013.01); *B60W 2710/083* (2013.01); *B60Y 2200/412* (2013.01); *F02D 2200/101* (2013.01); *F02D 2200/1002* (2013.01); *F02D 2200/503* (2013.01); *F02D 2250/22* (2013.01); *F02D 2250/24* (2013.01); *Y02T 10/148* (2013.01); *Y02T 10/6217* (2013.01); *Y02T 10/6286* (2013.01)

(58) Field of Classification Search
CPC ...... B60W 10/26; B60W 20/00; B60W 20/10; B60W 20/13; B60W 2300/17; F02D 2250/22; F02D 2250/24; F02D 2250/26
See application file for complete search history.

(56) References Cited

U.S. PATENT DOCUMENTS

| | | | | |
|---|---|---|---|---|
| 8,534,264 | B2 * | 9/2013 | Kawaguchi | B60W 10/06 123/350 |
| 8,651,219 | B2 * | 2/2014 | Yoshida | E02F 3/325 180/305 |
| 8,874,327 | B2 * | 10/2014 | Ishihara | E02F 9/2246 701/50 |
| 9,065,361 | B2 * | 6/2015 | Ishihara | B60W 10/06 |
| 9,068,321 | B2 * | 6/2015 | Hoshino | E02F 9/2075 |
| 9,340,953 | B2 * | 5/2016 | Sakamoto | B60K 6/485 |
| 9,487,932 | B2 * | 11/2016 | Ishihara | B60L 11/14 |
| 9,574,327 | B2 * | 2/2017 | Ishihara | E02F 9/2075 |
| 9,581,176 | B2 * | 2/2017 | Izumi | E02F 9/123 |
| 9,671,763 | B2 * | 6/2017 | Ishihara | B60K 6/485 |
| 2002/0125052 | A1 | 9/2002 | Naruse et al. | |
| 2010/0050601 | A1 | 3/2010 | Nakamura | |
| 2012/0186889 | A1 | 7/2012 | Yoshida et al. | |
| 2013/0090835 | A1 | 4/2013 | Take et al. | |

FOREIGN PATENT DOCUMENTS

| | | | |
|---|---|---|---|
| JP | 2007-177719 A | | 7/2007 |
| JP | 3156582 U | | 1/2010 |
| JP | 2011-149226 A | | 8/2011 |
| JP | 2011149226 A | * | 8/2011 |
| JP | 2011-246955 A | | 12/2011 |
| KR | 10-2011-0086495 A | | 7/2011 |
| KR | 10-2012-0139768 A | | 12/2012 |
| WO | WO 2007/139177 A1 | | 12/2007 |
| WO | WO 2014/087978 A1 | | 6/2014 |

OTHER PUBLICATIONS

Japanese-language Written Opinion (PCT/ISA/237) issued in PCT Application No. PCT/JP2015/083130 dated Feb. 23, 2016 (five pages).
Korean-language Office Action issued in counterpart Korean Application No. 10-2017-7004629 dated Mar. 21, 2018 (five (5) pages).
International Preliminary Report on Patentability (PCT/IB/338 & PCT/IB/373) issued in PCT Application No. PCT/JP2015/083130 dated Sep. 14, 2017, including English translation of document C2 (Japanese-language Written Opinion (PCT/ISA/237)) previously filed on Feb. 23, 2017 (8 pages).

* cited by examiner

EXISTING TECHNOLOGY

EXISTING TECHNOLOGY

EXISTING TECHNOLOGY

PRESENT INVENTION

PRESENT INVENTION

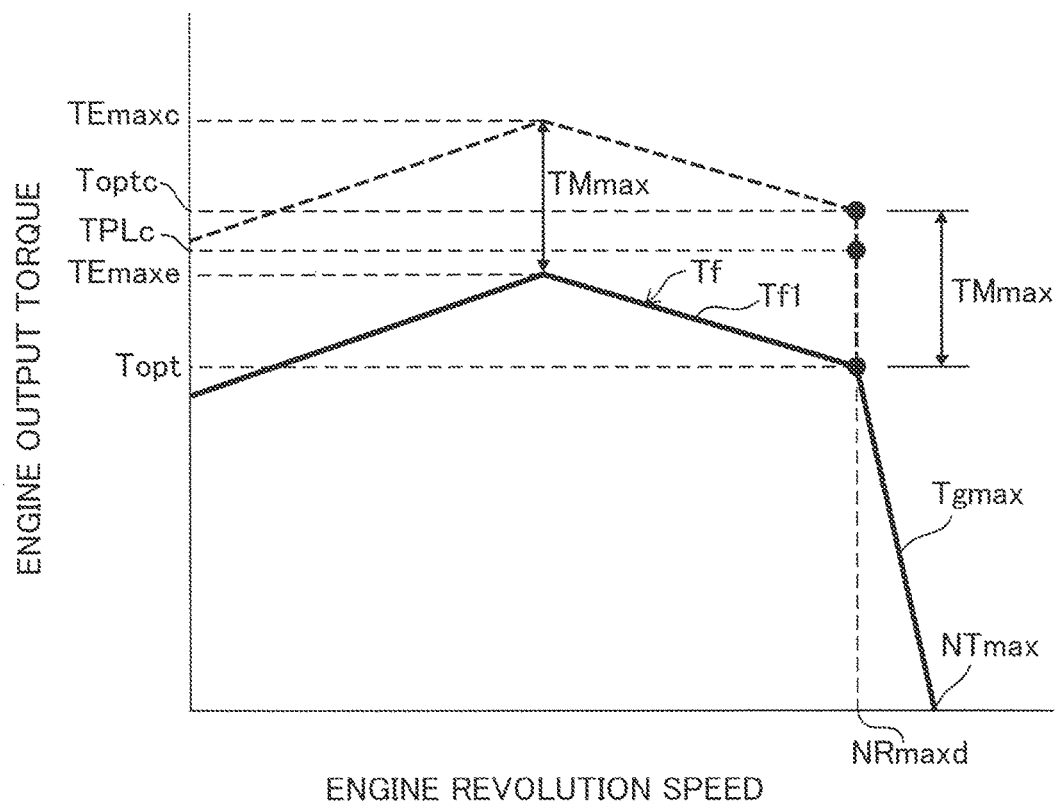

PRESENT INVENTION

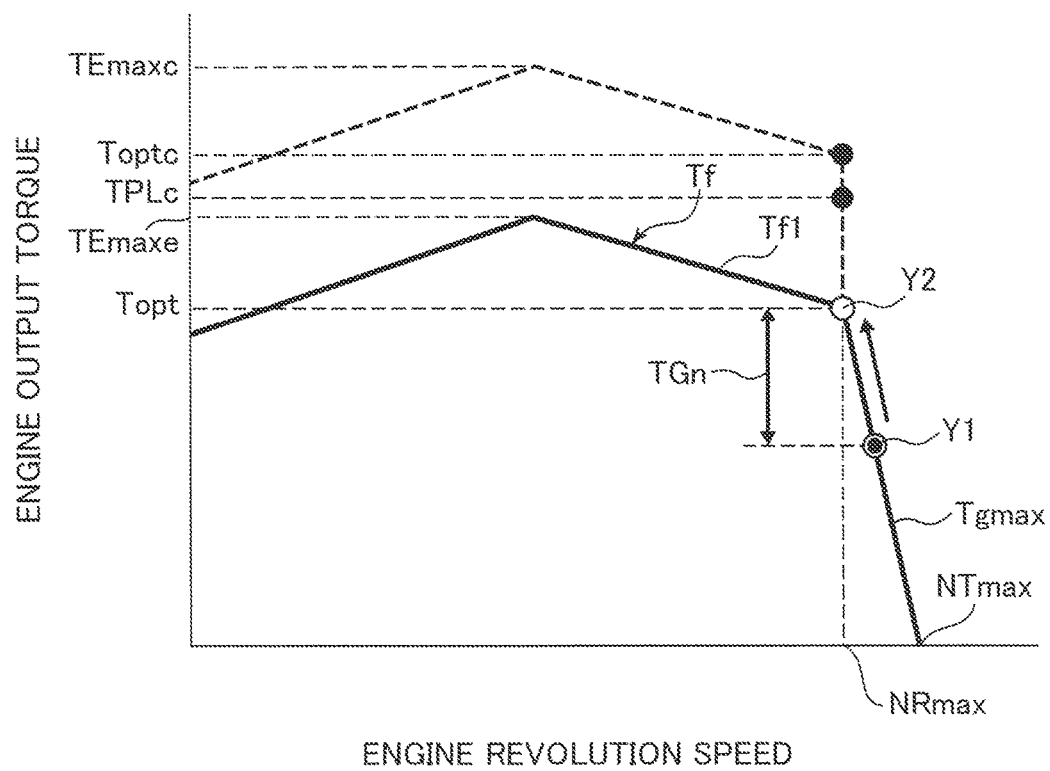

COMPARATIVE EXAMPLE

COMPARATIVE EXAMPLE

PRESENT INVENTION

HYBRID WORK MACHINE

TECHNICAL FIELD

The present invention relates to hybrid work machines and particularly to such hybrid work machines as small-sized hydraulic excavators.

BACKGROUND ART

In the field of work machines such as hydraulic excavators, recent years have seen the development of hybrid work machines that use both an engine (diesel engine) and an electric motor in order to, for example, improve fuel consumption, improve exhaust characteristics, or reduce noise, and some of them have been put to practical use. Patent Document 1 discloses such a hybrid construction machine.

In the hybrid construction machine disclosed in Patent Document 1, a generator-motor is provided as an auxiliary power source for a hydraulic pump driven by an engine. If the demanded torque of the hydraulic pump is larger than the engine output torque, the electric power of a battery is used to operate the generator-motor as a motor, thereby compensating for the shortage of the engine output torque. If the charge amount of the battery becomes insufficient, torque reducing control is performed on the hydraulic pump to cause the engine to coercively generate surplus torque for the engine and to operate the generator-motor as a generator, thereby rapidly charging the battery.

PRIOR ART DOCUMENT

Patent Document

Patent Document 1: JP-2011-149226-A

SUMMARY OF THE INVENTION

Problem to be Solved by the Invention

In the hybrid construction machine of Patent Document 1, if the charge amount of the battery is insufficient, torque reducing control is performed on the hydraulic pump to coercively generate surplus torque for the engine and to operate the generator-motor as a generator, thereby rapidly charging the battery.

However, during the rapid charging, the output power of the hydraulic pump decreases, which may cause trouble for work, such as excavation work, that requires high-load torque.

The invention has been made in view of the above problem, and an object of the invention is to provide a hybrid work machine having a hybrid system and a miniaturized engine, the work machine being capable of improving fuel consumption, improving exhaust characteristics, and reducing noise, the work machine being further capable of rapid charging of a power storage device while preventing decreases in the output power of a hydraulic pump if the charge amount of the power storage device is extremely insufficient.

Means for Solving the Problem

To achieve the above objects, the invention provides a hybrid work machine including: an engine; a hydraulic pump driven by the engine; a plurality of actuators driven by the hydraulic fluid delivered from the hydraulic pump; an engine revolution speed indication device for indicating a target revolution speed for the engine; an engine revolution speed detection device for detecting the actual revolution speed of the engine; a governor device for controlling a fuel injection amount such that an output torque of the engine increases as a load torque of the engine increases; a generator-motor coupled to the engine; a power storage device for supplying or receiving electric power to or from the generator-motor; and a control device for performing power assistance by supplying the electric power from the power storage device to the generator-motor and operating the generator-motor as a motor and for charging the power storage device by causing the engine to rotationally drive the generator-motor and operating the generator-motor as a generator. The engine has an output torque characteristic including an entire load characteristic in which the fuel injection amount of the governor device is maximum and a regulation characteristic in which the fuel injection amount of the governor device increases up to maximum, the entire load characteristic including: a first characteristic segment in which, as an engine revolution speed detected by the engine revolution speed detection device decreases from a rated revolution speed to a predetermined revolution speed, the output torque of the engine increases and the output torque of the engine becomes maximum at the predetermined revolution speed; and a second characteristic segment in which, as the engine revolution speed decreases from the predetermined revolution speed, the output torque of the engine decreases. The control device performs engine revolution speed decreasing control in which, if a charge rate of the power storage device becomes equal to or less than a minimum charge rate at which work continuation by drive assistance performed by the generator-motor is impossible, the target revolution speed of the engine is decreased, the control device also performing torque reducing control in which a maximum absorption torque of the hydraulic pump is reduced, the control device further performing charge control in which the power storage device is charged by operating the generator-motor as a generator with use of surplus torque generated for the engine by the engine revolution speed decreasing control and the torque reducing control.

In the thus-configured invention, the engine can be downsized by using power assistance to reduce the demanded torque of the engine. Therefore, it becomes possible to improve fuel consumption, improve exhaust characteristics, and reduce noise.

In addition, if the charge rate of the battery falls below the minimum charge rate (i.e., if the charge amount of the battery is extremely insufficient), the engine revolution speed decreasing control is performed to reduce the engine revolution speed, thereby increasing the engine output torque on the first characteristic segment of the engine entire load characteristic at the maximum horsepower revolution speed. This reduces the decrease amount in the maximum absorption torque of the hydraulic pump resulting from the torque reducing control, compared with the case in which only the torque reducing control is performed to produce the surplus torque. It is also possible to perform rapid charging of the power storage device while suppressing decreases in the output power of the hydraulic pump.

Effect of the Invention

In accordance with the invention, by adopting a hybrid system and a miniaturized engine, it is possible to improve fuel consumption, improve exhaust characteristics, and reduce noise. It is also possible to rapidly charge the battery while preventing decreases in the output power of the hydraulic pump if the charge amount of the battery is extremely insufficient.

BRIEF DESCRIPTION OF THE DRAWINGS

FIG. 9C is a graph illustrating the output torque characteristics of the hybrid drive system of a mini-excavator according to an embodiment of the invention, in which an engine is used in combination with a generator-motor;

FIG. 13B is a graph illustrating changes in system output torque due to battery charge control;

MODES FOR CARRYING OUT THE INVENTION

Embodiments of the present invention will now be described with reference to the accompanying drawings.

Structure

Figure 1:
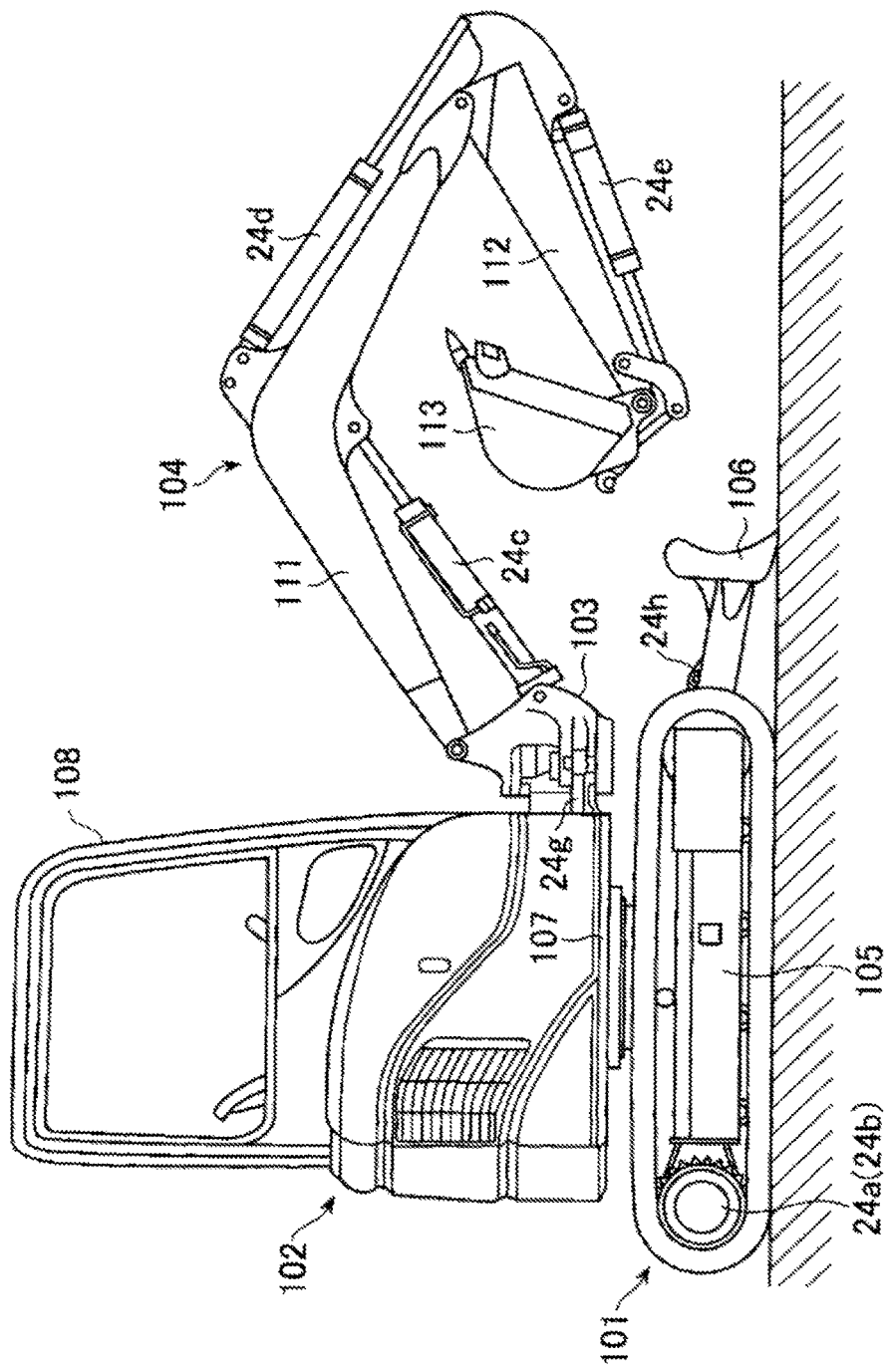
FIG. 1 is an external view of a small-sized hydraulic excavator, which is a hybrid work machine, according to an embodiment of the invention.

FIG. 1 is an external view of a small-sized hydraulic excavator that is a hybrid work machine according to an embodiment of the invention. In this specification, the term "small-sized hydraulic excavator" refers to a hydraulic excavator that belongs to the 8-ton class or lighter, including a mini-excavator.

The hydraulic excavator includes: a lower travel structure 101; an upper swing structure 102 mounted swingably on the lower travel structure 101; and a front work implement 104 connected to the distal end part of the upper swing structure 102 via a swing post 103 so as to move vertically and horizontally. The lower travel structure 101 is of a crawler type and has a vertically movable earth removal blade 106 provided at the front of a track frame 105. The upper swing structure 102 includes a swing base 107 that serves as a lower base structure and a cabin (operation room) 108 provided atop the swing base 107. The front work implement 104 includes a boom 111, an arm 112, and a bucket 113. The proximal end of the boom 111 is pin-connected to the swing post 103 while the distal end of the boom 111 is pin-connected to the proximal end of the arm 112. The distal end of the arm 112 is pin-connected to the bucket 113.

The upper swing structure 102 is swingably driven by a swing motor, not illustrated, relative to the lower travel structure 101. The swing post 103 and the front work implement 104 are rotatably driven leftward and rightward by a swing cylinder 24g relative to the swing base 107. The boom 111, the arm 112, and the bucket 113 are rotatably driven upward and downward by extending/shrinking a boom cylinder 24c, an arm cylinder 24d, and a bucket cylinder 24e, respectively. The lower travel structure 101 is rotationally driven by left and right travel motors 24a and 24b, and the blade 106 is driven upward and downward by a blade cylinder 24h.

Figure 2:
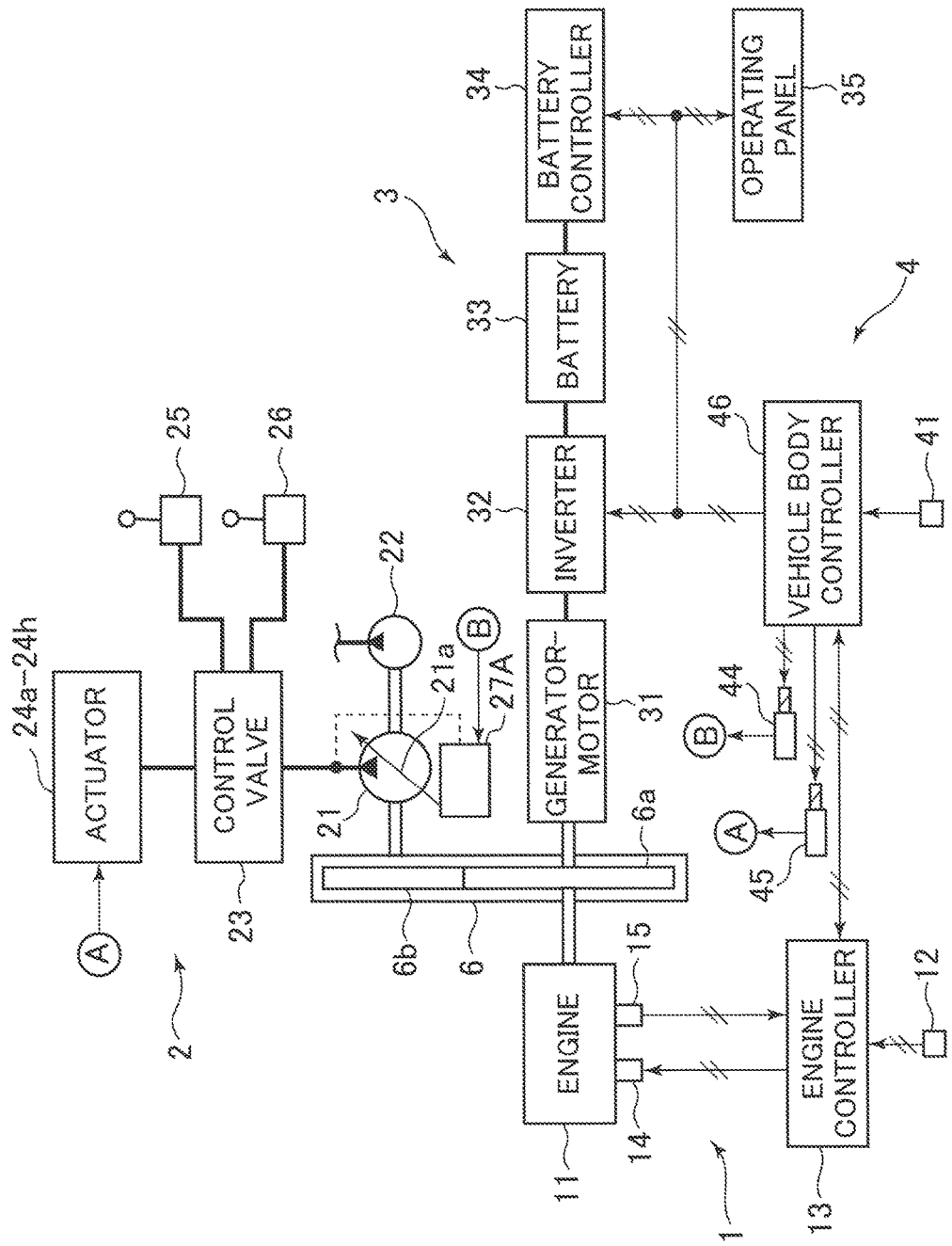
FIG. 2 is a diagram illustrating the drive system of a hydraulic excavator according to an embodiment of the invention.

FIG. 2 is a diagram illustrating the hybrid drive system of the hydraulic excavator illustrated in FIG. 1. In FIG. 2, the hybrid drive system includes an engine system 1, a hydraulic system 2, a generator-motor system 3, and a control system 4.

The engine system 1 includes a diesel engine 11, an engine control dial 12, an engine controller 13, an electronic governor 14, and an engine revolution speed detection device 15. As described later, the diesel engine 11 is downsized (i.e., has smaller engine power) compared with conventional ones.

The engine control dial 12 is operated by the operator to indicate a target revolution speed of the engine 11. The target revolution speed is the engine revolution speed when no load is applied to the engine 11. The engine controller 13 receives a target revolution speed signal from the engine control dial 12 and performs predetermined computing processing to obtain a target fuel injection amount. The engine controller 13 also controls the electronic governor 14 to control the fuel injection amount injected into each cylinder of the engine, thereby controlling engine output torque and engine revolution speed. It should be noted that this embodiment is based on the assumption that droop control, in which the engine revolution speed is reduced and the fuel injection amount is increased as engine load increases, is used for the control of the electronic governor 14. The engine revolution speed detection device 15 is used to detect the actual revolution speed of the engine 11 (engine revolution speed). The engine revolution speed detected by the engine revolution speed detection device 15 is input to a vehicle body controller 46 (described later) via the engine controller 13.

Figure 3:
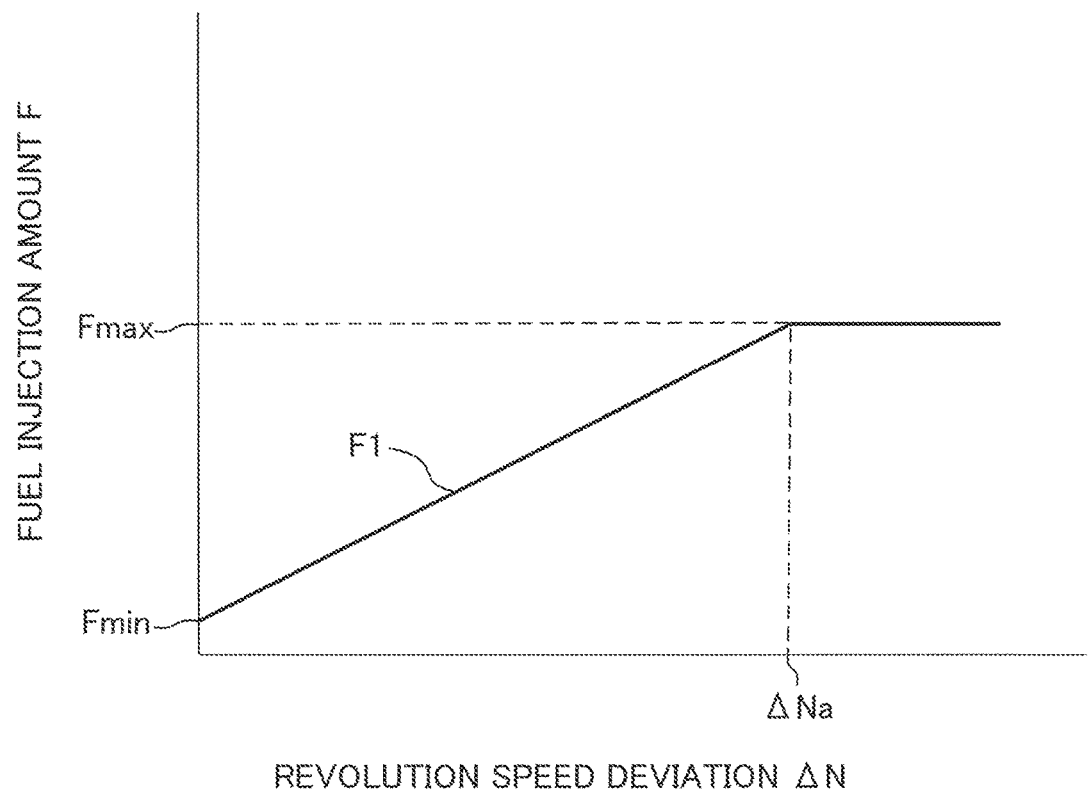
FIG. 3 is a graph illustrating the fuel injection amount characteristic used by an engine controller to compute the fuel injection amount.

FIG. 3 is a graph illustrating the fuel injection amount characteristic used by the engine controller 13 to compute the fuel injection amount. In the figure, the horizontal axis represents the deviation $\Delta N$ between the target engine revolution speed indicated by the engine control dial 12 and the actual revolution speed of the engine 11 detected by the engine revolution speed detection device 15, and the vertical axis represents the fuel injection amount F. This fuel injection amount characteristic is set such that when the revolution speed deviation $\Delta N$ is zero, the fuel injection amount F is a minimum Fmin, and such that as the revolution speed deviation $\Delta N$ increases, the fuel injection amount F increases proportionally and linearly along the oblique line F1. Also, when the revolution speed deviation $\Delta N$ reaches a predetermined value $\Delta Na$, the fuel injection amount F reaches a maximum Fmax, which is a constant value. If the revolution speed deviation $\Delta N$ exceeds the value $\Delta Na$, the fuel injection amount F is kept at the maximum Fmax. In normal engine control, a fuel injection amount characteristic is stored for each target revolution speed, and based on the target revolution speed indicated by the engine control dial 12, the corresponding fuel injection amount characteristic is selected. Then, the computed revolution speed deviation $\Delta N$ is referred to the selected fuel injection amount characteristic to obtain the corresponding fuel injection amount. Thus obtained fuel injection amount is then fed to the electronic governor 14 as a target value, thereby controlling the fuel injection amount injected into each cylinder of the engine 11.

Figure 4:
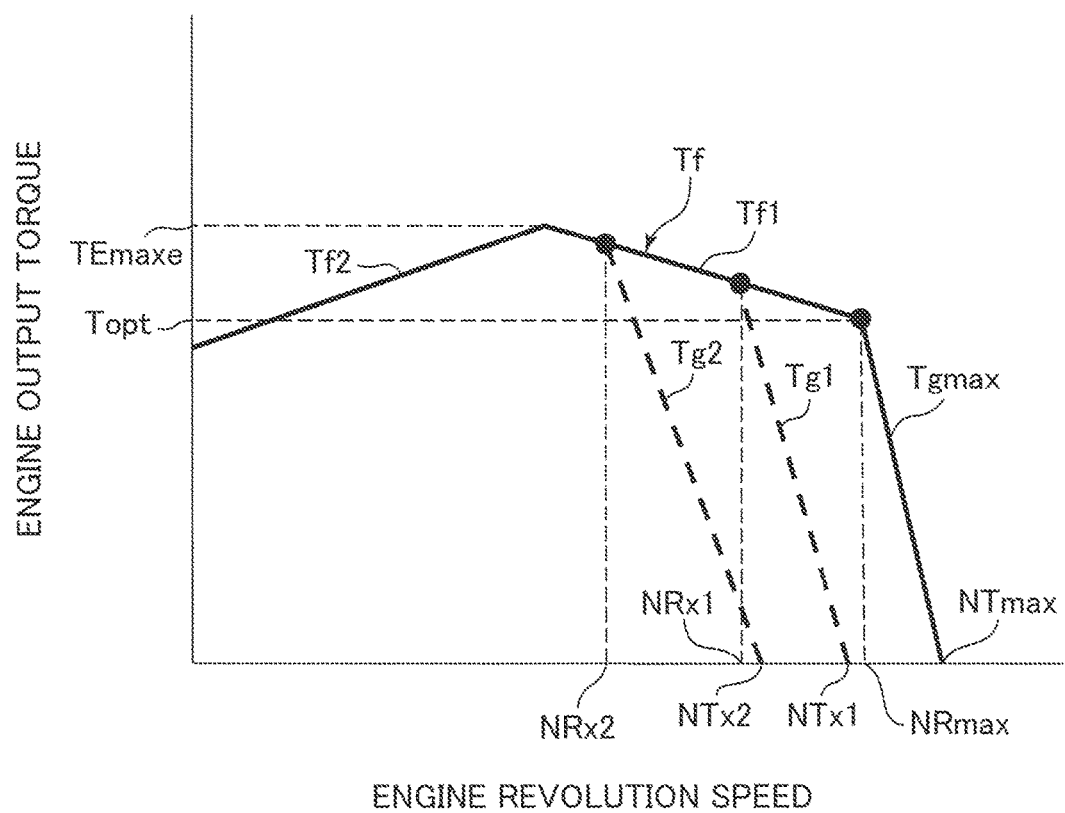
FIG. 4 is a graph illustrating the output torque characteristic of an engine obtained when the fuel injection amount is controlled as illustrated in FIG. 3.

FIG. 4 is a graph illustrating the output torque characteristic of the engine 11 when the fuel injection amount is controlled in such a manner. FIG. 4 assumes a case where the target revolution speed indicated by the engine control dial 12 is the maximum. In the figure, the horizontal axis represents engine revolution speed while the vertical axis represents engine output torque. The output torque characteristic of the engine 11 is made up of an entire load characteristic Tf in which the fuel injection amount is the maximum and a regulation characteristic Tgmax in which the fuel injection amount is adjusted based on the fuel injection characteristic illustrated in FIG. 3. The entire load characteristic Tf is determined by the characteristics of the engine 11 and is made up of a leftward-rising characteristic segment Tf1 and a leftward-falling characteristic segment Tf2. In the characteristic segment Tf1, the output torque of the engine 11 increases up to a maximum TEmaxe as the engine revolution speed decreases. In the characteristic segment Tf2, as the engine revolution speed decreases further, the output torque of the engine 11 decreases. The regulation characteristic Tgmax exhibits the characteristic of droop control in which as the engine revolution speed decreases, the output torque of the engine 11 increases based on the fuel injection characteristic illustrated in FIG. 3.

In other words, when no load is applied to the engine 11, the fuel injection amount is the minimum Fmin, and the engine revolution speed at this time is the intersecting point NTmax between the line of the regulation characteristic Tgmax and the horizontal axis. As the deviation $\Delta N$ between the target revolution speed NTmax and the actual revolution speed increases with an increase in the load torque of the engine 11 (absorption torque of a hydraulic pump 21), the fuel injection amount also increases. Accordingly, the output torque of the engine 11 increases proportionally and linearly along the oblique line of the regulation characteristic Tgmax. When the load torque of the engine 11 increases further and the revolution speed deviation $\Delta N$ reaches the predetermined value $\Delta Na$, the fuel injection amount reaches the maximum value (FIG. 3). The intersecting point between the line of the regulation characteristic Tgmax and the entire load characteristic Tf is the point where the fuel injection amount reaches the maximum Fmax and the output horsepower of the engine 11 becomes the maximum (described later). The revolution speed (maximum horsepower revolution speed) NRmax at this time is the rated revolution speed, and the output torque Topt of the engine 11 at this time is the rated torque.

If the engine control dial 12 indicates a target revolution speed NTx1 or NTx2, which are lower than the maximum target revolution speed NTmax, the engine controller 13 selects the fuel injection characteristic that corresponds to the target revolution speed NTx1 or NTx2 so as to control the fuel injection amount. The regulation characteristic correspondingly changes to the broken line Tg1 or Tg2. As a result, the maximum horsepower revolution speed drops to NR1 or NR2 (described later).

In the present embodiment, the target revolution speed indicated by the engine control dial 12 has been defined as the revolution speed NTmax, NTx1, or NTx2 when no load is applied to the engine 11. It should be noted however that the target revolution speed can instead be the maximum horsepower revolution speed (the rated revolution speed when the target revolution speed indicated by the engine control dial 12 is the maximum) NRmax, NR1, or NR2. Also, while in the present embodiment, the regulation characteristic exhibits the characteristic of droop control, it can instead exhibit the characteristic of isochronous control in which the fuel injection amount is adjusted such that the engine revolution speed is maintained at a constant value regardless of increases in engine load (described later).

The output shaft of the engine 11 is coupled to the hydraulic system 2 and the generator-motor system 3 via a power distribution device 6 including a large-diameter gear 6a and a small-diameter gear 6b.

The hydraulic system 2 includes a hydraulic pump 21, a pilot pump 22, a control valve 23, a plurality of hydraulic actuators 24a to 24h, and a plurality of operating devices 25 and 26.

The hydraulic pump 21 and the pilot pump 22 are coupled to the output shaft of the engine 11 via the power distribution device 6 and driven by the engine 11. The hydraulic fluid delivered from the hydraulic pump 21 is supplied to the plurality of hydraulic actuators 24a to 24h via the control valve 23 to drive respective driven bodies. The hydraulic pump 21 is of the variable displacement type and includes a displacement varying mechanism 21a (e.g., swash plate) and a pump regulator 27 that adjusts the tilting position of the displacement varying mechanism 21a and controls the displacement of the hydraulic pump.

The plurality of hydraulic actuators 24a to 24h include the left and right hydraulic travel motors and other actuators. The other actuators include, for example, a boom hydraulic cylinder, an arm hydraulic cylinder, a bucket hydraulic cylinder, a swing hydraulic cylinder, and blade a hydraulic cylinder.

The control valve 23 includes therein a plurality of main spools in association with the plurality of hydraulic actuators 24a to 24h. These main spools are selectively operated by hydraulic signals output from the operating devices 25 and 26. The operating device 25 is a representation of left and right travel operating devices while the operating device 26 is a representation of operating devices other than the travel operating devices.

The generator-motor system 3 includes a generator-motor 31, an inverter 32, a battery (power storage device) 33, a battery controller 34, and an operating panel 35.

The generator-motor 31 is coupled to the output shaft of the engine 11 via the power distribution device 6. When the engine 11 has surplus torque, the generator-motor 31 is driven by the surplus torque and operates as a generator. The electric energy generated by the generator-motor 31 is stored in the battery 33 via the inverter 32. On the other hand, if the ratio of power storage amount to the capacity of the battery 33 (hereinafter referred to as "the charge rate") is equal to or greater than the minimum charge rate (e.g., 30%) required for drive assistance, and also if the hydraulic pump 21 requires drive assistance, the electric energy of the battery 33 is supplied to the generator-motor 31 via the inverter 32, thereby operating the generator-motor 31 as a motor. The battery controller 34 monitors the power storage amount in the battery 33, and the operating panel 35 displays information regarding the power storage amount (power storage information).

The control system 4 includes a travel speed selecting switch 41, a torque control solenoid valve 44, a travel speed selecting solenoid valve 45, and a vehicle body controller 46, which acts as a control device. The vehicle body controller 46 is electrically connected to the travel speed selecting switch 41, the torque control solenoid valve 44, and the travel speed selecting solenoid valve 45. The vehicle body controller 46 is also electrically connected to the inverter 32, the battery controller 34, the operating panel 35, and the engine controller 13. The vehicle body controller 46 receives indication signals from the travel speed selecting switch 41, engine revolution speed information (a target revolution speed and the detected actual revolution speed) from the engine controller 13, operating signals from the operating panel 35, and power storage information (the charge rate) from the battery controller 34. The vehicle body controller 46 then performs predetermined computing processing to output control signals to the inverter 32, the torque control solenoid valve 44, and the travel speed selecting solenoid valve 45.

Figure 5:
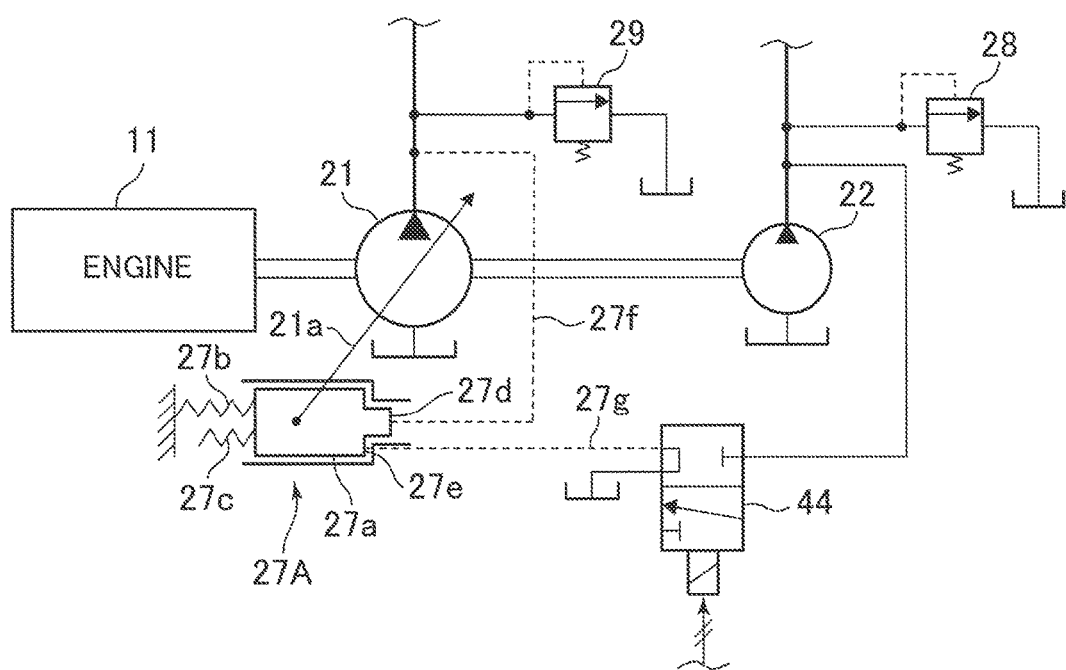
FIG. 5 is a diagram illustrating the detailed structure of a pump regulator.

FIG. 5 is a diagram illustrating the detailed structure of the pump regulator 27.

The pump regulator 27 includes a demanded flow rate response control section, such as an LS control section, that controls the tilting position of the displacement varying mechanism 21a of the hydraulic pump 21 (thus controls the displacement of the hydraulic pump) such that the hydraulic pump 21 delivers hydraulic fluid at the flow rates corresponding to the demanded flow rates based on the operation amounts of the plurality of operating devices 25 and 26. The pump regulator 27 also includes a torque control section that controls the maximum tilting position of the displacement varying mechanism 21a of the hydraulic pump 21 (thus controls the maximum displacement of the hydraulic pump) such that the maximum absorption torque of the hydraulic pump 21 does not exceed a predetermined value. Note that FIG. 5 illustrates only the torque control section for simplification purposes, and the power distribution device 6 is not illustrated.

In FIG. 5, the pump regulator 27 includes a control spool 27a operatively connected to the displacement varying mechanism 21a of the hydraulic pump 21; two springs, or a first spring 27b and a second spring 27c, that act on the control spool 27a in the displacement increasing direction of the hydraulic pump 21; and first and second pressure receiving sections 27d and 27e that act on the control spool 27a in the displacement reducing direction of the hydraulic pump 21. The delivery pressure of the hydraulic pump 21 is introduced to the first pressure receiving section 27d through a pilot line 27f. The first and second springs 27b and 27c are designed to set the maximum absorption torque of the hydraulic pump 21. The first spring 27b is longer than the second spring 27c. When the control spool 27a is in the initial position illustrated in FIG. 5, only the first spring 27b is in contact with the control spool 27a, thereby biasing the control spool 27a in the right direction in the figure. When the control spool 27a moves in the left direction in the figure to some extent, the second spring 27c also comes into contact with the control spool 27a, whereby both the first and second springs 27b and 27c bias the control spool 27a in the right direction in the figure.

When the vehicle body controller 46 does not output any control signals, the torque control solenoid valve 44 is in the off position illustrated in the figure, thereby causing the second pressure receiving section 27e of the pump regulator 27 to communicate to a reservoir. If the vehicle body controller 46 outputs a control signal, the torque control solenoid valve 44 is selected to the on position, thereby introducing the delivery pressure of the pilot pump 22 to the second pressure receiving section 27e as a control pressure. The delivery pressure of the pilot pump 22 is maintained at a constant value (e.g., 4 Mpa) by a pilot relief valve 28.

Figure 6:
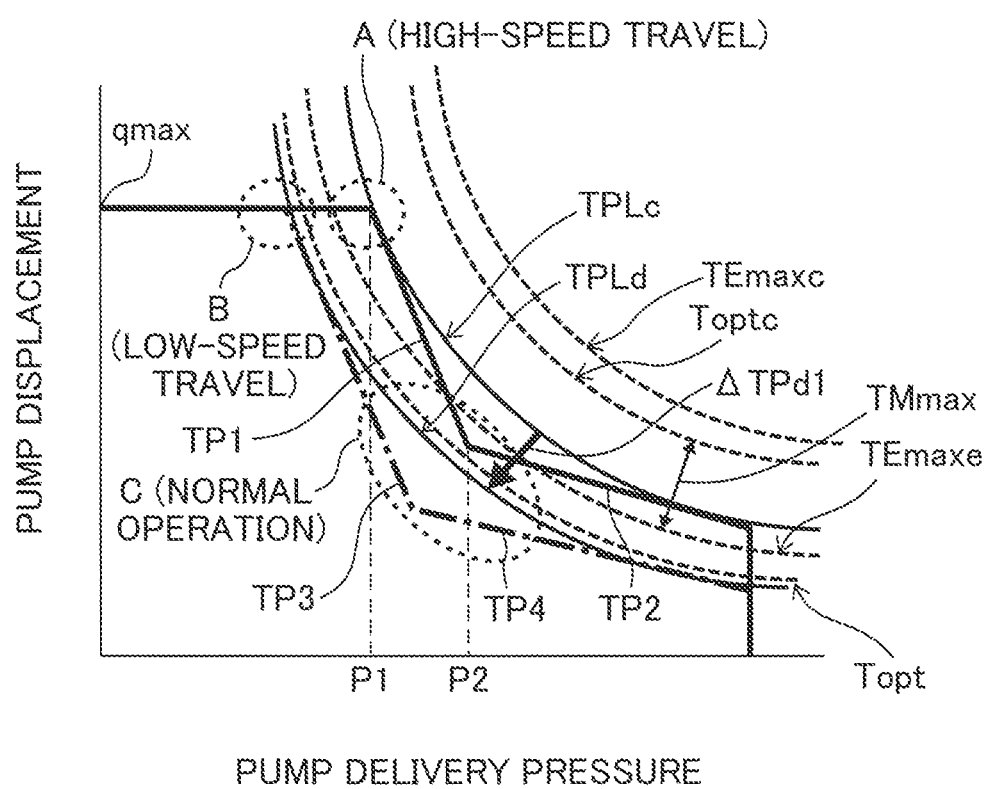
FIG. 6 is a pump torque characteristic diagram illustrating the functions of the torque control section of the pump regulator.

FIG. 6 is a pump torque characteristic diagram illustrating the functions of the torque control section of the pump regulator 27, where the horizontal axis represents the delivery pressure of the hydraulic pump 21 and the vertical axis represents the displacement of the hydraulic pump 21.

In FIG. 6, the bent line that is made up of two lines (solid lines) illustrated by reference symbols TP1 and TP2 represents the maximum absorption torque characteristic set by the first and second springs 27b and 27c. The curve illustrated by a reference symbol TPLc in contact with the lines TP1 and TP2 represents the maximum absorption torque of the hydraulic pump 21, which can be paraphrased as the limiting torque associated with torque control. The maximum absorption torque (limiting torque) TPLc of the hydraulic pump 21 is set such that it is lower, by a predetermined margin, than the rated system torque Toptc (described later) that is obtained by adding the maximum torque TMmax of the generator-motor 31 to the rated torque Topt of the engine 11. The maximum absorption torque TPLc of the hydraulic pump 21 is larger than the rated torque Topt of the engine 11, and in the present embodiment, the maximum absorption torque TPLc of the hydraulic pump 21 is also larger than the maximum torque TEmaxe (described later).

As can be seen from the relation between the absorption torque of the hydraulic pump 21 and the output torque of the engine 11, the engine 11 is downsized (miniaturized) such that the rated torque Topt is smaller than the maximum absorption torque TPLc of the hydraulic pump 21 and the maximum absorption torque TPLc of the hydraulic pump 21 cannot be covered by the output torque of the engine 11 alone. In the present embodiment, the engine 11 is also downsized such that not only the rated torque Topt but the maximum torque TEmaxe is smaller than the maximum absorption torque TPLc of the hydraulic pump 21. Note that in the figure, A represents a representative power usage range during high-speed travel, B a representative power usage range during low-speed travel, and C a representative power usage range during normal operation, each of which will be described later.

The torque control section of the pump regulator 27 limits the maximum absorption torque of the hydraulic pump 21 by limiting the maximum tilting position of the displacement varying mechanism 21a of the hydraulic pump 21 (thus the maximum displacement of the hydraulic pump 21) based on the delivery pressure of the hydraulic pump 21. Where the delivery pressure of the hydraulic pump 21 increasing, before the delivery pressure of the hydraulic pump 21 exceeds a first value P1, the hydraulic force of the first pressure receiving section 27d to which the delivery pressure of the hydraulic pump 21 is introduced is smaller than the biasing force of the first spring 27b, thus maintaining the maximum displacement of the hydraulic pump 21 at qmax. In other words, the displacement of the hydraulic pump 21 can be increased up to qmax by control of the demanded flow rate response control section. After the delivery pressure of the hydraulic pump 21 increased to exceed the first value P1, the hydraulic force of the first pressure receiving section 27d becomes larger than the biasing force of the first spring 27b, moving the control spool 27a in the left direction in FIG. 5. Also, the maximum displacement of the hydraulic pump 21 begins to decrease along the line TP1 on the bent line. As a result, the displacement of the hydraulic pump 21 controlled by the demanded flow rate response control section is limited to equal to or smaller than the maximum displacement defined by the line TP1, and the absorption torque of the hydraulic pump 21 (the product of pump delivery pressure by displacement) is controlled so as not to exceed the limiting torque TPLc.

When the delivery pressure of the hydraulic pump 21 further increases to exceed a second value P2, the control spool 27a comes into contact with the second spring 27c, thereby decreasing the ratio of the movement amount of the control spool 27a to the delivery pressure increase amount of the hydraulic pump 21 (i.e., reducing ratio of the displacement of the hydraulic pump 21). As a result, the maximum displacement of the hydraulic pump 21 decreases along the line TP2, which is less steep than the line TP1. In this case as well, the absorption torque of the hydraulic pump 21 is controlled so as not to exceed the limiting torque TPLc. After the delivery pressure of the hydraulic pump 21 reaches the set pressure of a main relief valve 29, the delivery pressure of the hydraulic pump 21 is prevented from increasing further.

When the torque control solenoid valve 44 is selected to the on position, the control pressure is introduced to the second pressure receiving section 27e, and the hydraulic force of the second pressure receiving section 27e acts on the control spool 27a against the biasing force of the first and second springs 27b and 27c. Consequently, the maximum absorption torque set by the first and second springs 27b and 27c is adjusted such that it decreases by the amount of the hydraulic force of the second pressure receiving section 27e. Also, as the arrow illustrates, the maximum absorption torque characteristic is shifted from the bent line made up of the two solid lines TP1 and TP2 to the bent line made up of the two dotted lines TP3 and TP4 (reduced torque amount $\Delta$TPd1). As a result, as the delivery pressure of the hydraulic pump 21 increases, the maximum displacement of the hydraulic pump 21 decreases along the dotted lines TP3 and TP4 on the bent line. The maximum absorption torque of the hydraulic pump 21 at this time (the product of pump delivery pressure by maximum displacement) decreases such that it shifts from the maximum absorption torque TPLc associated with the lines TP1 and TP2 to the curve TPLd1 in contact with the lines TP3 and TP4. Thus, surplus torque TG (described later) is produced coercively for the engine 11. In the specification, this control is referred to as torque reducing control.

Figure 7:
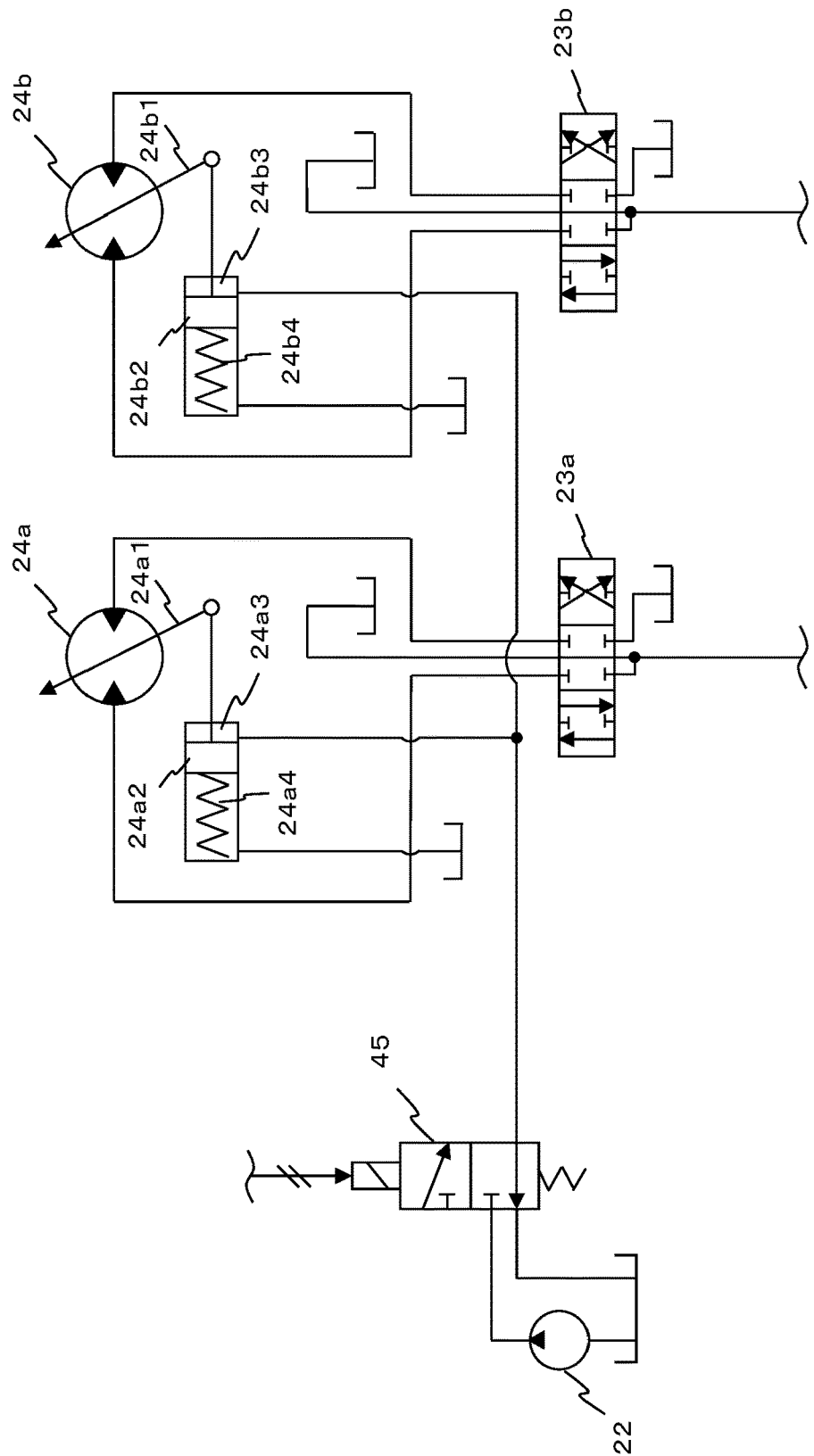
FIG. 7 is a diagram illustrating the hydraulic circuit part associated with, among the control valve and hydraulic actuators of a hydraulic system, left and right hydraulic travel motors.

FIG. 7 is a diagram illustrating the hydraulic circuit part associated with, among the control valve and a plurality of hydraulic actuators of the hydraulic system, the left and right hydraulic travel motors. In the figure, the reference symbols 23a and 23b denote main spools for the left and right travel motors while the reference symbols 24a and 24b denote the left and right hydraulic travel motors. The left and right travel motors 24a and 24b are connected to the hydraulic pump 21 via the main spools 23a and 23b.

The left and right travel motors 24a and 24b are both of the variable displacement type and include, respectively, displacement varying mechanisms (swash plates) 24a1 and 24b1 and control pistons 24a2 and 24b2 that drive the displacement varying mechanisms 24a1 and 24b1, respectively. Pressure receiving sections 24a3 and 24b3 are formed on one side of the control pistons 24a2 and 24b2 while springs 24a4 and 24b4 are disposed on the opposite side.

When the travel speed selecting solenoid valve 45 is in the off position illustrated in the figure, the pressure receiving sections 24a3 and 24b3 of the control pistons 24a2 and 24b2 communicate to the reservoir. Also, pushed by the force of the springs 24a4 and 24b4, the control pistons 24a2 and 24b2 are in the positions illustrated in the figure, and the displacement varying mechanisms 24a1 and 24b1 are kept at a large tilting position (large displacement position). If the travel speed selecting solenoid valve 45 is selected to the on position, the delivery pressure of the pilot pump 22 is introduced to the pressure receiving sections 24a3 and 24b3 of the control pistons 24a2 and 24b2 as the control pressure. Consequently, the control pistons 24a2 and 24b2 begin to operate, moving the displacement varying mechanisms 24a1 and 24b1 from the large tilting position (large displacement position) to a small tilting position (small displacement position). At the large tilting position, the travel motors 24a and 24b are capable of rotating at a low speed and in a state suitable for low-speed travel (low-speed large-displacement mode). At the small tilting position, by contrast, the travel motors 24a an 24b are capable of rotating at a high speed and in a state suitable for high-speed travel (high-speed small-displacement mode). The vehicle body controller 46 receives indication signals of the travel speed selecting switch 41. If the travel speed selecting switch 41 indicates low-speed travel, the vehicle body controller 46 performs no action, just keeping the travel speed selecting solenoid valve 45 at the off position. If the travel speed selecting switch 41 indicates high-speed travel, the vehicle body controller 46 outputs a control signal to the travel speed selecting solenoid valve 45, thereby switching the valve 45 to the on position.

Next, the operating principles of the invention is described.

Figure 8A:
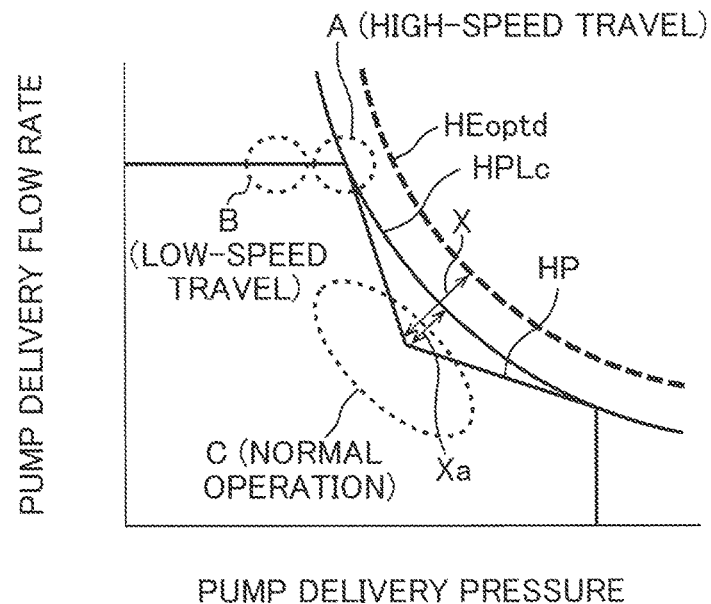
FIG. 8A is a graph illustrating the relation between the PQ characteristics (horsepower characteristics) of the hydraulic pump of a typical conventional mini-excavator and its representative power usage range.
Figure 8B:
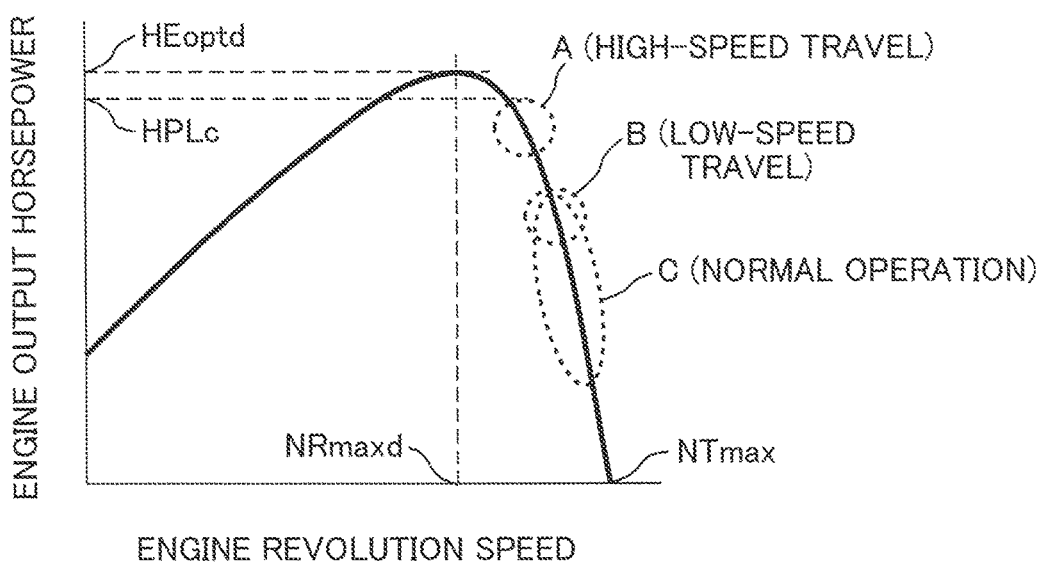
FIG. 8B is a graph illustrating the relation between the engine output horsepower characteristics of a typical conventional mini-excavator and its representative power usage range.
Figure 8C:
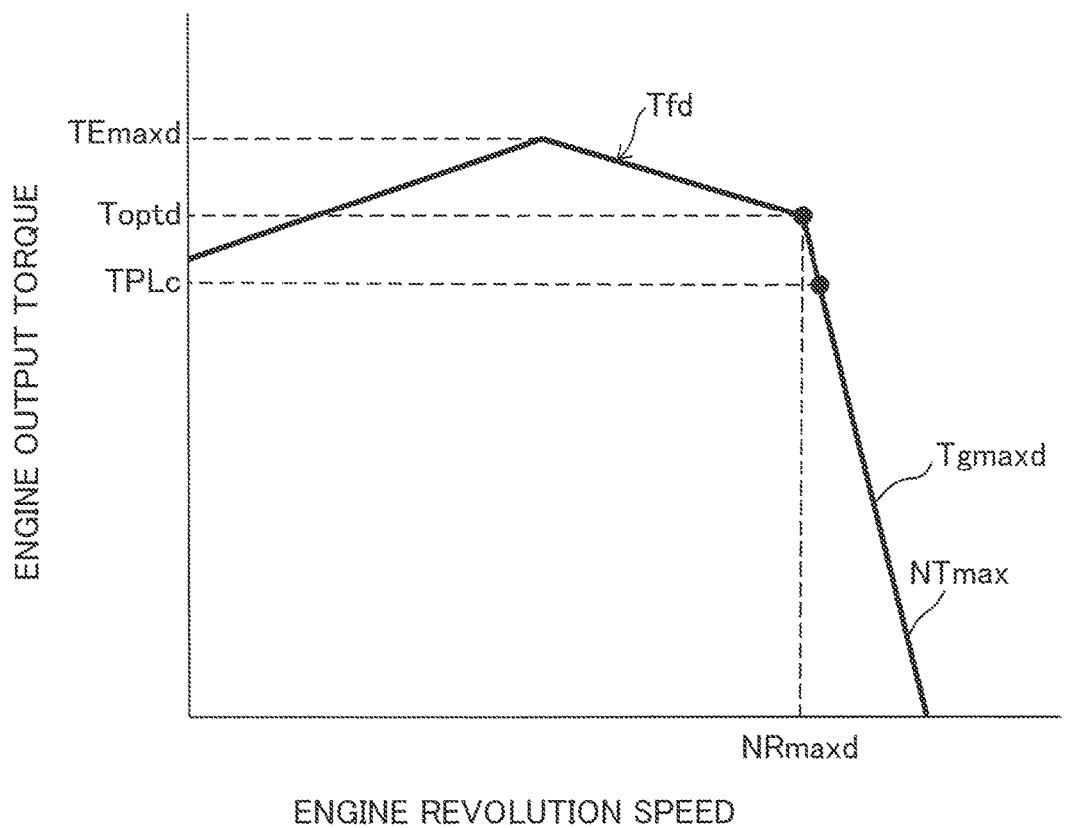
FIG. 8C is a graph illustrating the output torque characteristics of the engine of a typical conventional mini-excavator.

FIG. 8A is a graph illustrating the relation between the PQ characteristics (horsepower characteristics) of the hydraulic pump of a conventional typical mini-excavator and its representative power usage range. The horizontal axis represents the delivery pressure of the hydraulic pump while the vertical axis represents the delivery flow rate of the hydraulic pump. FIG. 8B is a graph illustrating the relation between the engine output horsepower characteristics of the same mini-excavator and its representative power usage range. The horizontal axis represents engine revolution speed while the vertical axis represents engine output horsepower. FIG. 8C is a graph illustrating the output torque characteristics of the engine of the same mini-excavator, where the horizontal axis presents engine revolution speed and the vertical axis represents engine output torque. Similar to FIG. 4, FIGS. 8A, 8B, and 8C assume a case where the target revolution speed indicated by the engine control dial is the maximum target revolution speed NTmax.

First described are the PQ characteristics of a hydraulic pump. The PQ characteristics of the hydraulic pump refers to output horsepower characteristics of the hydraulic pump obtained when work is done by using an engine to rotate the hydraulic pump that has certain maximum absorption torque characteristics. The PQ characteristics of the hydraulic pump of FIG. 8A assumes a case, as an example, where the hydraulic pump 21 having the maximum absorption torque characteristic illustrated in FIG. 6 is used and where the engine revolution speed is a rated revolution speed NRmaxd. The rated revolution speed NRmaxd is the engine revolution speed at the intersecting point between the regulation characteristic Tgmaxd and the entire load characteristic Tfd in FIG. 8C. As illustrated in FIG. 8B, the rated revolution speed NRmaxd is the engine revolution speed obtained when the output horsepower of the engine controlled based on the maximum target revolution speed NTmax becomes maximum.

The work state of a typical mini-excavator can be divided into state in high-speed travel, low-speed travel, and normal operation. In FIGS. 8A and 8B, A denotes a representative power usage range in high-speed travel, B a representative power usage range in low-speed travel, and C a representative power usage range in normal operation. High-speed travel refers to the state in which the travel motors 24a and 24b are in the high-speed small-displacement mode and the operating device 25 for travel is operated for travelling. Low-speed travel refers to the state in which the travel motors 24a and 24b are in the low-speed large-displacement mode and the operating device 25 for travel is operated for travelling. Normal operation refers to the state in which the operating device 26 used for other than travel (particularly, the operating device associated with one of the hydraulic actuators 24c, 24d, 24e, or the swing motor, which are associated with the front work implement 104) is operated to perform work.

In a typical mini-excavator (small-sized excavator), the high-speed travel A requires a high speed (a large flow rate); thus, the output power of the hydraulic pump 21 is the largest in the high-speed travel A, as illustrated in FIGS. 8A and 8B. The output power of the hydraulic pump 21 is smaller in the low-speed travel B and the normal operation C than in the high-speed travel A. This is a major difference from middle- or large-sized hydraulic excavators in which output power of the hydraulic pump becomes the largest during normal operation.

In a conventional mini-excavator, the maximum absorption torque TPLc (the limiting torque associated with torque control) of the hydraulic pump 21 illustrated in FIG. 6 is set such that, as illustrated in FIG. 8C, it is smaller than the rated torque Toptd of the engine by a predetermined margin. The reference symbol HPLc of FIG. 8A represents the maximum absorption horsepower of the hydraulic pump 21 that corresponds to the maximum absorption torque TPLc of the hydraulic pump 21 illustrated in FIGS. 6 and 8C. The maximum absorption horsepower HPLc of the hydraulic pump 21 is also set such that it is smaller than the maximum horsepower HEoptd (rated horsepower) of the engine by a predetermined margin. Since the output power of the hydraulic pump 21 is the largest in the high-speed travel, the maximum absorption horsepower HPLc of the hydraulic pump 21 is also set such that it is large enough to cover the hydraulic horsepower demanded of the hydraulic pump 21 in the operation state of the high-speed travel A.

On the other hand, since the maximum absorption torque characteristic of the pump regulator 27 (FIG. 6) is set by the two springs, or the first and second springs 27b and 27c, such that it forms the bent line made up of the two solid lines TP1 and TP2, the PQ characteristic of the hydraulic pump 21 also takes the form of a bent line as illustrated by the reference symbol HP. Thus, in normal operation, the power usage range C of the hydraulic pump 21 is spaced far from the maximum horsepower HEoptd (rated horsepower) of the engine by the distance X, which is large due to including the distance Xa accounting for the recess at the bent point of the PQ characteristic line, resulting in a state having too much margin. This also means that the engine output horsepower is not used effectively.

Figure 9A:
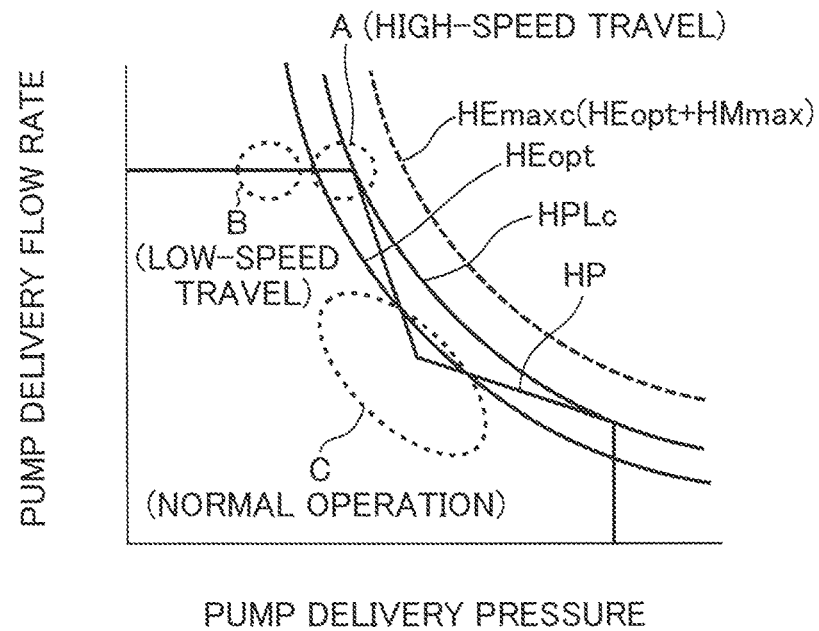
FIG. 9A is a graph illustrating the relation between the PQ characteristics (horsepower characteristics) of the hydraulic pump of a mini-excavator according to an embodiment of the invention and its representative power usage range.
Figure 9B:
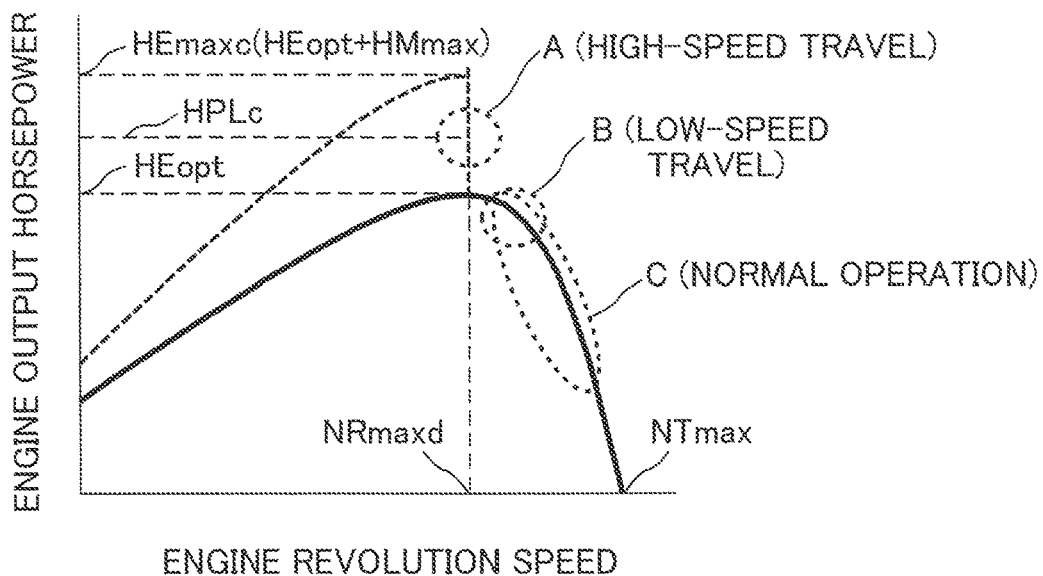
FIG. 9B is a graph illustrating the relation between the engine output horsepower characteristics of a mini-excavator according to an embodiment of the invention and its representative power usage range.

FIG. 9A is a graph illustrating the relation between the PQ characteristics (horsepower characteristics) of the hydraulic pump of a mini-excavator according to the present embodiment and its representative power usage range. FIG. 9B is a graph illustrating the relation between the engine output horsepower characteristics of the mini-excavator and its representative power usage range. FIG. 9C is a graph illustrating the output torque characteristics of a hybrid drive system in which the engine 11 is used in combination with the generator-motor 31. Similar to FIG. 4, FIGS. 9A, 9B, and 9C assume a case where the target revolution speed indicated by the engine control dial is the maximum target revolution speed NTmax.

In the present embodiment, the maximum horsepower (rated horsepower) HEopt of the engine 11 is made smaller than the conventional maximum horsepower (rated horsepower) HEoptd illustrated in FIG. 8B and is below the maximum absorption horsepower HPLc associated with the horsepower characteristic HP of the hydraulic pump 21. Further, in the present embodiment, the maximum horsepower HEopt (rated horsepower) of the engine 11 is set such that it can cover most part of the hydraulic horsepower demanded of the hydraulic pump 21 in the operation state other than the high-speed travel A (i.e., the low-speed travel B and the normal operation C) and such that it cannot cover the hydraulic horsepower demanded of the hydraulic pump 21 in the state of high-speed travel A. This can be paraphrased in terms of the output torque of the engine 11 as follows. As illustrated in FIG. 6, the rated torque Topt of the engine 11 is set such that it can cover most part of the demanded hydraulic torque of the hydraulic pump 21 in the operation state other than the high-speed travel A (i.e., the low-speed travel B and the normal operation C) and such that it cannot cover the demanded hydraulic torque of the hydraulic pump 21 in the operation state of the high-speed travel A.

Thus, in the present embodiment, the downsized engine 11 is used, and the generator-motor 31 is operated as a motor to perform power assistance control such that the engine revolution speed is maintained at the rated revolution speed NRx when the engine revolution speed becomes lower than the rated revolution speed NRmax. In contrast, the generator-motor 31 is operated as a generator to perform charge control (first charge control) when the engine revolution speed is larger than the rated revolution speed NRx (i.e, when the engine 11 has surplus torque).

For example, if the absorption torque of the hydraulic pump 21 increases up to the maximum absorption torque TPLc and the revolution speed of the engine 11 becomes lower than the rated revolution speed NRmax during the high-speed travel A, the generator-motor 31 is operated as a motor by the battery 33 to perform power assistance. The reference symbol Toptc of FIG. 9C corresponds to the conventional rated torque Toptd of FIG. 8C (e.g., Toptc=Toptd) and represents the rated system torque Toptc at the time of maximum assistance by the generator-motor 31 (the sum of the engine rated torque Topt and the maximum torque TMmax of the motor). The reference symbol HEmaxc of FIG. 9A represents the system output horsepower at the time of maximum assistance by the generator-motor 31, that is, the rated system horsepower (the sum torque of the engine rated horsepower HEopt and the maximum horsepower HMmax of the motor).

During the normal operation C, the generator-motor 31 is operated as a motor by the battery 33 to perform power assistance only if the power of the rated torque Topt of the engine 11 cannot cover the output power of the hydraulic pump 21. In cases other than the above, only the output power of the engine 11 is used to drive the hydraulic pump 21. If the remaining charge amount of the battery 33 is low, the charge control (first charge control) is performed to charge the battery 33 with electric power.

As stated above, the output torque of the engine 11 is made smaller than in conventional technology, and the rated torque Topt or the maximum torque TEmaxe is made smaller than the maximum absorption torque TPLc of the hydraulic pump 21. This makes it possible to fully utilize the output torque of the engine 11 and downsize (miniaturize) the engine 11. Downsizing the engine 11 can reduce fuel consumption, reduce the amounts of harmful gases exhausted from the engine 11, and reduce noise. Also, exhaust post-treatment devices can be miniaturized or made simpler, which, coupled with the cost decrease resulting from the downsizing of the engine 11, reduces engine manufacturing costs and thus lowers the price of the entire machine. Moreover, since the engine 11 is downsized to such an extent that the maximum torque TEmaxe of the engine 11 is smaller than the maximum absorption torque TPLc of the hydraulic pump 21, it becomes possible to avoid layout issues associated with adopting a hybrid system for a small-sized work machine such as a mini-excavator, to secure installation space for the battery 33, and to easily adopt the hybrid system.

Further, since the work machine of the present embodiment is a small-sized hydraulic excavator, such as a mini-excavator, in which the output power of the hydraulic pump 21 is smaller in the normal operation C than in the high-speed travel A, output power lower than the rated torque Topt of the engine 11 is enough to cover the output power of the hydraulic pump 21 during the normal operation C even if the engine 11 is downsized. In such a small-sized work machine, by performing power assistance control when the engine revolution speed is lower than the rated revolution speed NRmax and by performing charge control (first charge control) when the engine revolution speed is higher than the rated revolution speed NRx, the power assistance control needs to be performed less frequently, and the power consumption by the battery 33 can be prevented from increasing. Also, the charge control can be performed more frequently on the battery 33, and the charge amount of the battery 33 can thus be increased. As a result, in a small-sized construction machine, such as a mini-excavator, in which the electric power consumed by the battery cannot be recovered by the regenerative energy at the time of boom lowering or swing braking, the remaining charge amount of the battery 33 can be prevented from decreasing soon even if the battery 33 is miniaturized so as to be installed in a small space on the swing frame. Also, work needs to be interrupted less frequently for the purpose of charging the battery 33, which increases the operating rate of the machine body.

Moreover, in the present embodiment, since the first power assistance control is selected to the first charge control and vice versa, the remaining charge amount of the battery 33 can be prevented from decreasing soon even if the work machine is a small-sized work machine such as a mini-excavator and the battery 33 is miniaturized. However, in a small-sized hydraulic excavator, the electric power consumed by the battery 33 cannot easily be recovered by the regenerative energy at the time of swing braking using a swing electric motor. Thus, even if the charge control is performed effectively on the battery 33 as stated above, the charge amount of the battery cannot be prevented from falling below a minimum charge rate, which requires measures for such a case to be taken into account.

In the present embodiment, therefore, when the battery charge amount falls below the minimum charge rate, second charge control is performed using engine revolution speed decreasing control in combination with pump torque reducing control. This allows rapid charging of the battery 33 while preventing decreases in the operation amount of the hydraulic excavator, as described later. As a result, even if the charge amount of the battery 33 falls below the minimum charge rate due to the miniaturization of the engine 11, a certain amount of work can be performed during charging of the battery 33, thus preventing decreases in the operating efficiency of the machine body during battery charging.

Control

Figure 10:
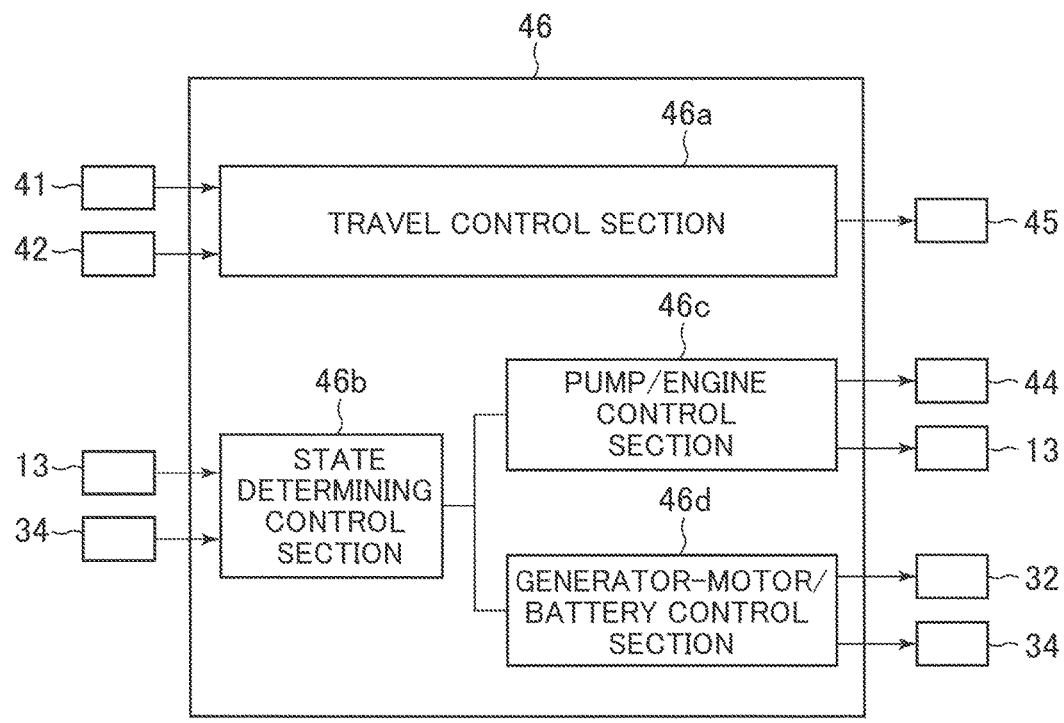
FIG. 10 is a block diagram illustrating the control performed by a vehicle body controller.

Next described with reference to FIG. 10 are the control functions of the vehicle body controller 46 that realize the above-described operating principles of the invention.

FIG. 10 is a block diagram illustrating the control performed by the vehicle body controller 46. The vehicle body controller includes a travel control section 46a, a state determining control section 46b, a pump/engine control section 46c (first control section), and a generator-motor/battery control section 46d (second control section).

The travel control section 46a outputs on/off selecting signals for the travel speed selecting solenoid valve 45 in response to input signals from the travel speed selecting switch 41. The state determining control section 46b determines state based on the target revolution speed and actual revolution speed of the engine input from the engine controller 13 and on the charge rate of the battery 33 input from the battery controller 34. The pump/engine control section 46c outputs on/off selecting signals to the torque control solenoid valve 44 and engine revolution speed reducing indications to the engine controller 13 based on the determination results obtained by the state determining control section 46b. The generator-motor/battery control section 46d outputs control signals to the inverter 32 and charge indications to the battery controller 34 based on the determination results obtained by the state determining control section 46b.

Figure 11:
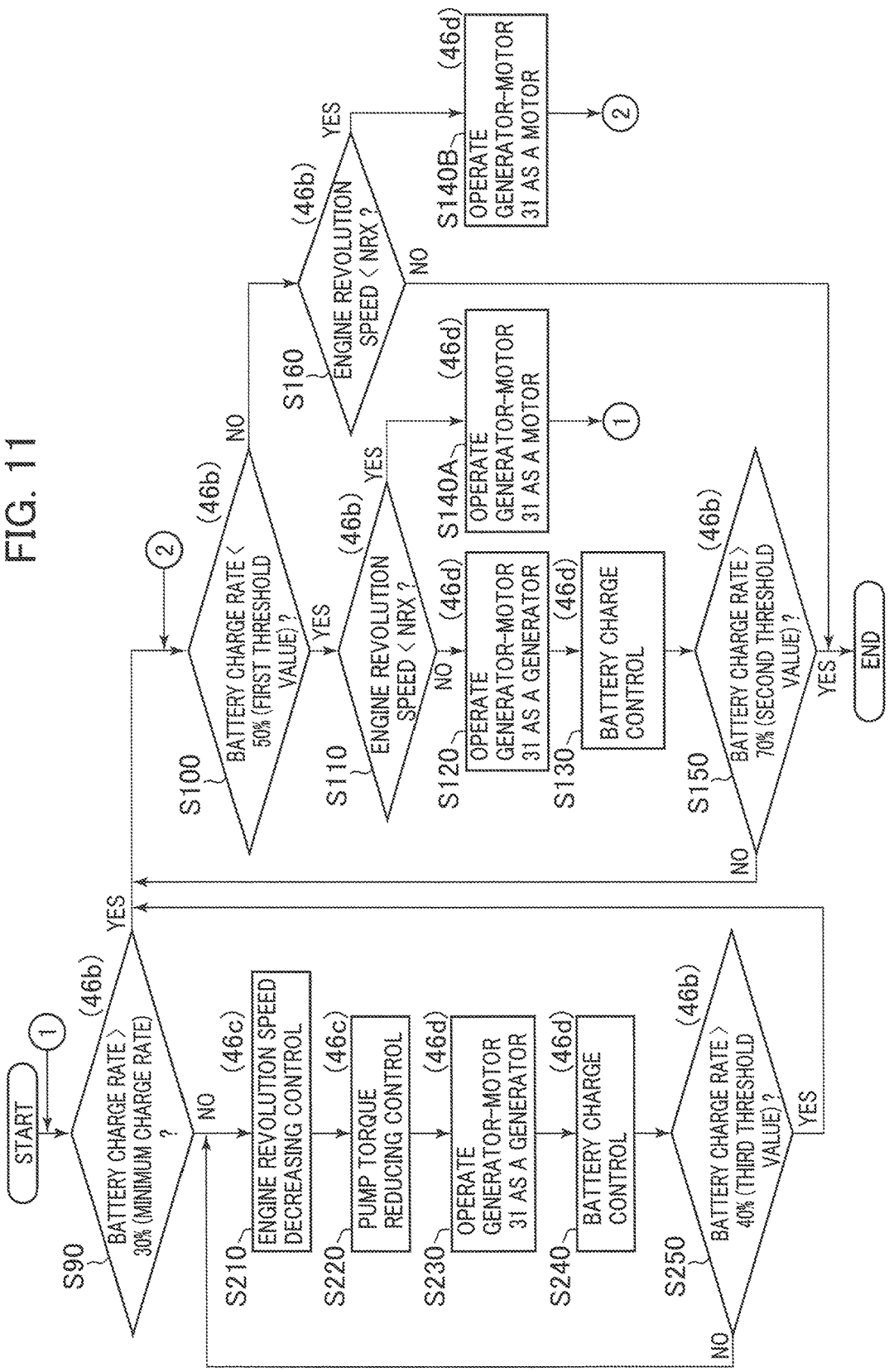
FIG. 11 is a flowchart of the control performed by the vehicle body controller.

FIG. 11 is a flowchart of the control performed by the control sections 46b to 46d (FIG. 10) of the vehicle body controller 46. In FIG. 11, the reference symbol in the parentheses given to each step of the process flow represents the control section that performs the step. Each step is successively described below.

First, it is determined whether the charge rate of the battery 33 acquired from the power storage information of the battery controller 34 is greater than a minimum charge rate (SOC) or not (step S90). The minimum charge rate is the charge rate (e.g., 30%) at which work continuation by the drive assistance performed by the generator-motor 31 is impossible. If the answer to step S90 is yes (battery charge rate >30%), it is determined whether the battery charge rate is lower than a first threshold value or not (step S100). The first threshold value is the threshold value used to determine whether or not battery charge control is necessary to perform charging although the generator-motor 31 can be driven with the charge amount of the battery. The first threshold value is set at a value (e.g., 50%) higher than the minimum charge rate (e.g., 30%) at which work continuation is impossible. If the answer to step S100 is yes (battery charge rate <50%), it is determined whether or not the current engine revolution speed (actual revolution speed) acquired from the engine revolution speed information of the engine controller 13 is lower than the maximum horsepower revolution speed NRx (step S110). As stated earlier, when the target revolution speed indicated by the engine control dial 12 is the maximum NTmax, the maximum horsepower revolution speed is the rated revolution speed NRmax.

Figure 12:
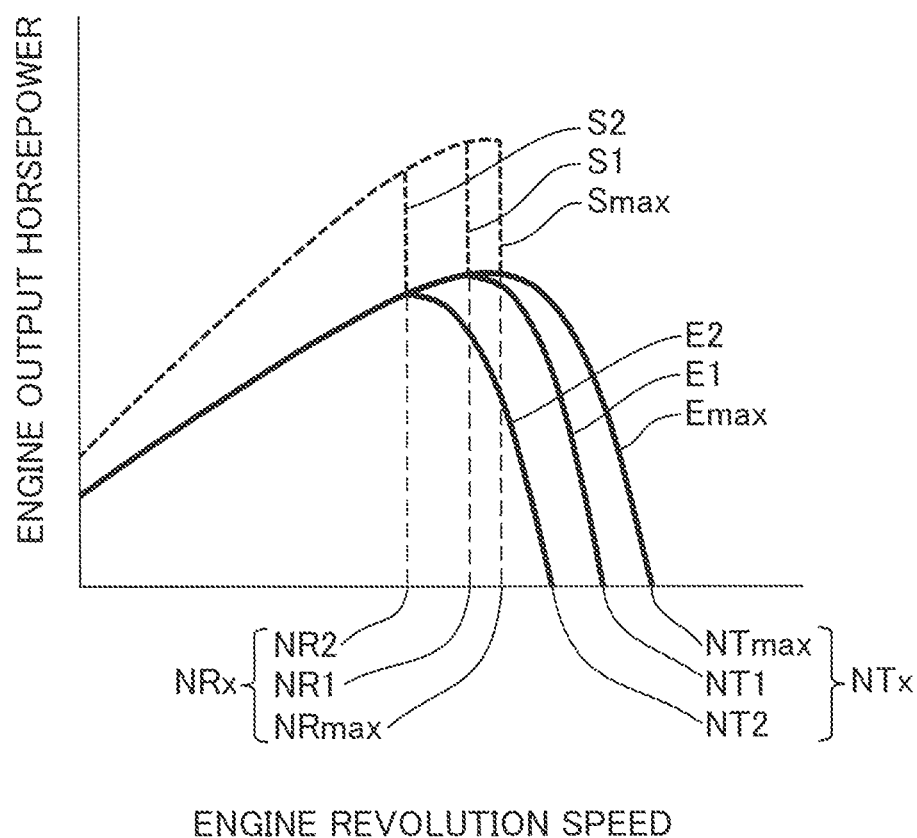
FIG. 12 is a graph illustrating the relation of a target revolution speed to engine output horsepower and maximum horsepower revolution speed.

The maximum horsepower revolution speed is described in detail with reference to FIG. 12. FIG. 12 is a graph illustrating the relation of the target revolution speed to the engine output horsepower and the maximum horsepower revolution speed. In the figure, the solid lines Emax, E1, and E2 and the broken lines Smax, S1, and S2 represent engine horsepower characteristics and system horsepower characteristics when the target revolution speed is set at NTmax, NT1, and NT2. The output horsepower of the engine 11 controlled based on the target revolution speeds NTmax, NT1, and NT2 (referred to collectively as NTx) is maximum when the engine revolution speed is at the maximum horsepower revolution speeds NRmax, NR1, and NR2 (referred to collectively as NRx), respectively. Note that the maximum horsepower revolution speed NRmax that corresponds to the maximum target revolution speed NTmax is equal to the rated revolution speed of the engine 11. By storing in advance the correspondence relation illustrated in FIG. 12 between the target revolution speed NTx and the maximum horsepower revolution speed NRx on a storage device of the vehicle body controller 46, the maximum horsepower revolution speed can be changed based on the setting of the target revolution speed by the engine control dial 12.

Referring again to FIG. 11, if the answer to step S110 is yes (engine revolution speed<maximum horsepower revolution speed NRx), the generator-motor 31 is operated as a motor (step S140A). The process then returns to step S90, followed by repetition of the processes after step S90. With the power assistance control performed in step S140A, the engine revolution speed begins to increase and returns to the maximum horsepower revolution speed NRx. Then, the engine revolution speed is maintained at the maximum horsepower revolution speed NRx. Also, similar to conventional technology, the output torque of the hybrid drive system increases up to TPLc (see FIG. 9C), and the system output horsepower increases up to HPLc. An example of a control method for operating the generator-motor 31 as a motor is to obtain the revolution speed deviation ΔNd by subtracting the engine revolution speed (actual revolution speed) from the maximum horsepower revolution speed and control the generator-motor 31 such that the drive torque increases as the revolution speed deviation ΔNd increases.

If the answer to step S110 is no (engine revolution speed maximum horsepower revolution speed NRx), the load torque of the engine 11 (the absorption torque of the hydraulic pump 21) is smaller than the rated torque Topt of the engine 11, and the engine 11 has some leeway. In this case, the surplus torque of the engine 11 is used to drive and operate the generator-motor 31 as a generator (step S120), thereby performing battery charge control (step S130). This increases the output torque of the engine 11 up to the rated torque Topt, reduces the engine revolution speed up to the maximum horsepower revolution speed NRx, and increases the engine output horsepower up to the maximum horsepower. Also, by driving the generator 31 with the surplus torque of the engine 11, the generator 31 is driven. The electric power generated by the generator 31 is stored in the battery 33 via the inverter 32. An example of a control method for operating the generator-motor 31 as a generator is to obtain the revolution speed deviation ΔNc by subtracting the maximum horsepower revolution speed from the engine revolution speed (actual revolution speed) and control the generator-motor 31 such that the power generating torque increases as the revolution speed deviation ΔNc increases.

After step S130, it is determined whether or not the battery charge rate is larger than a second threshold value (step S150). The second threshold value is the threshold value used to determine if battery charging is unnecessary; it is set at a value higher than the first threshold value (e.g., 70%). If the answer to step S150 is yes (battery charge rate >70%), the process ends. If, on the other hand, the answer to step S150 is no (battery charge rate ≥70%), the process returns to step S100, followed by repetition of the processes after step S100.

If the answer to step S100 is no (battery charge rate ≤50%), charging of the battery 33 can be regarded as unnecessary. In this case, similar to step S110, it is determined whether or not the engine revolution speed is lower than the maximum horsepower revolution speed NRx (step S160). If the answer to step S160 is yes (engine revolution speed<maximum horsepower revolution speed NRx), the generator-motor 31 is operated as a motor (step S140B). The process then returns to step S100, followed by repetitions of the processes after step S100. This maintains the engine revolution speed at the maximum horsepower revolution speed NRx, increases the system output torque up to TPLc as in conventional technology (see FIG. 9C), and increases the system output horsepower up to HPLc as in conventional technology. If, on the other hand, the answer to step S160 is no (engine revolution speed≥maximum horsepower revolution speed NRx), the process ends.

In step S90, if the charge rate of the battery 33 is equal to or less than the minimum charge rate (e.g, 30%), the process proceeds to step S210.

The processes after step S210 are used to perform rapid charge control. After the engine revolution speed decreasing control (step S210) and the pump torque reducing control (step S220) are performed, the charge control (second charge control) (steps S230 and S240) is performed on the battery 33.

In the engine revolution speed decreasing control of step S210, the maximum target revolution speed of the engine 11 is decreased from NTmax to Ntc. To perform this control, the vehicle body controller 46 stores in advance the target revolution speed NTc for the engine revolution speed decreasing control and outputs the target revolution speed NTc to the engine controller 13. The engine controller 13 selects the smaller of the target revolution speed NTx indicated by the engine control dial 12 and the target revolution speed NTc as the target revolution speed for fuel injection control. The engine controller 13 thus calculates the fuel injection amount based on the selected target revolution speed, thereby controlling the electronic governor 14. This decreases the maximum target revolution speed of the engine 11 from NTmax to NTc and increases the output torque at the maximum horsepower revolution speed of the engine 11 from Topt to Topt1 (FIG. 16B). It should be noted that the target revolution speed NTx indicated by the engine control dial 12 can instead be input to the vehicle body controller 46 and the maximum target revolution speed and can instead be changed by the vehicle body controller 46.

Figure 16A:
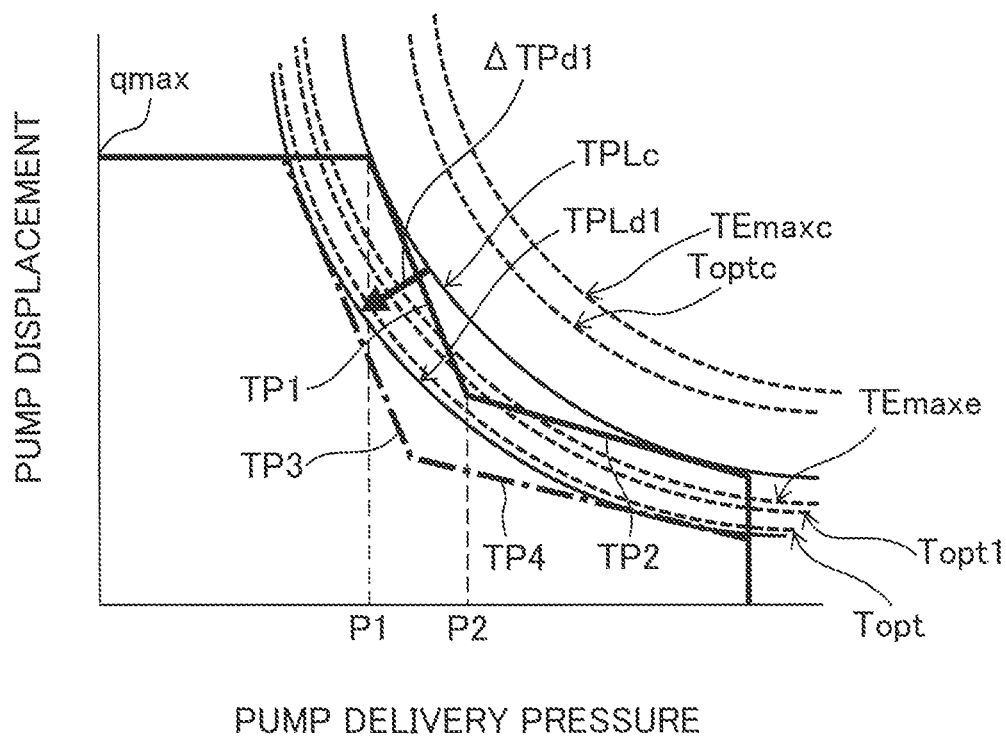
FIG. 16A is a graph illustrating a change in the maximum absorption torque of a hydraulic pump 21 (reduced torque amount) when, in an embodiment of the invention, both engine revolution speed decreasing control and the pump torque reducing control are performed for the rapid charge control.
Figure 16B:
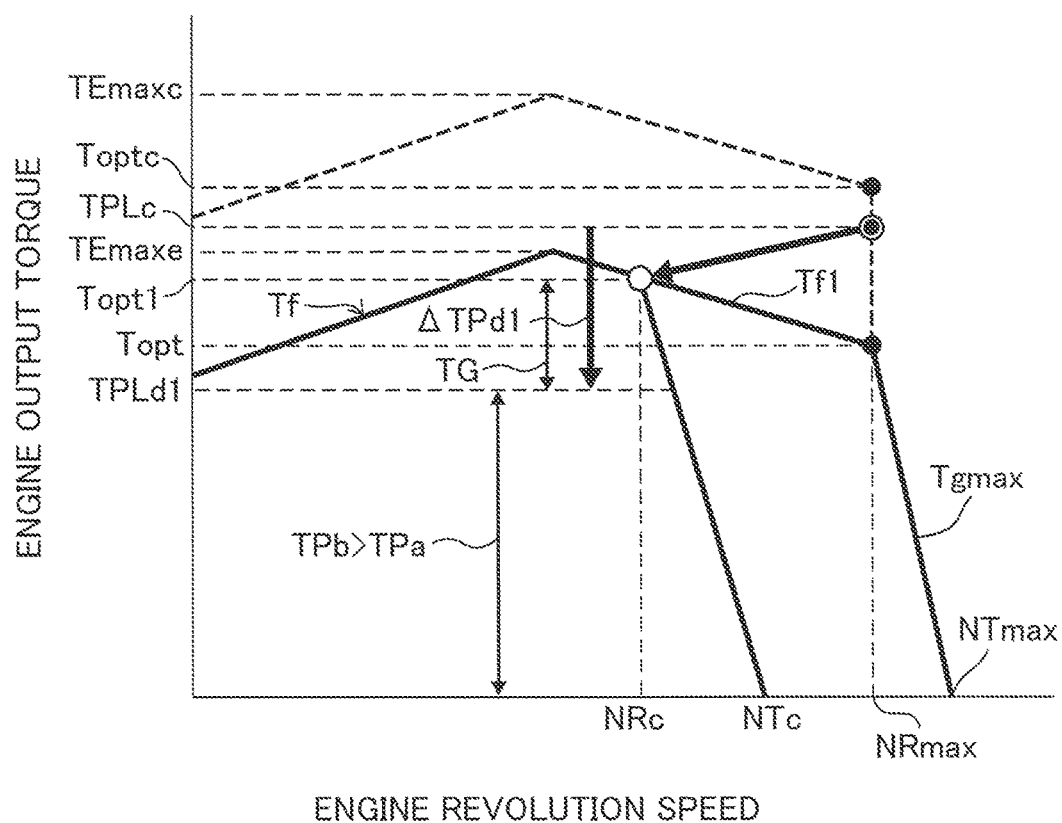
FIG. 16B is a graph illustrating the reduced torque amount required in an embodiment of the invention and the allocation of the surplus torque of an engine and the maximum torque usable for work.

In the pump torque reducing control of step S220, the vehicle body controller 46 outputs a control signal to the torque control solenoid valve 44 to reduce the maximum absorption torque of the hydraulic pump 21 from TPLc to TPLd1 (FIGS. 6 and 16A).

In the charge control of steps S230 and 240, the surplus torque of the engine 11 that has been produced coercively by the above-described engine revolution speed decreasing control and pump torque reducing control is used to operate the generator-motor 31 as a generator and performs rapid charging of the battery 33.

As described above, in steps 210 through 240, if the charge rate of the battery 33 (power storage device) falls below the minimum charge rate at which work continuation by the drive assistance performed by the generator-motor 31 is impossible, the second charge control is performed. Specifically, in the second control, surplus torque is produced coercively for the engine 11 by performing the engine revolution speed decreasing control to reduce the target revolution speed of the engine 11 and the torque reducing control to reduce the maximum absorption torque of the hydraulic pump 21. This surplus torque is then used to operate the generator-motor 31 as a generator to charge the battery 33.

After step S240, it is determined whether or not the charge rate of the battery 33 is larger than a third threshold value set in advance (step S250). The third threshold value is the charge rate showing that the charge amount of the battery 33 has got out an extremely insufficient state, and it is set at a value (e.g., 40%) higher than the minimum charge rate (e.g., 30%). If the answer to step S250 is no (battery charge rate third threshold value (40%)), steps 210 through 240 are repeated until the battery charge rate becomes equal to or greater than the third threshold value. Steps S210 through S250 are coercive rapid battery charge control (rapid charge control) performed if the charge amount of the battery 33 is extremely insufficient.

If the answer to step S250 is yes (battery charge rate>third threshold value (40%)), the process proceeds to step S100 to perform the above-described power assistance control (steps S140A and S130B) or charge control (steps S120 and S130).

Operation

Figure 13A:
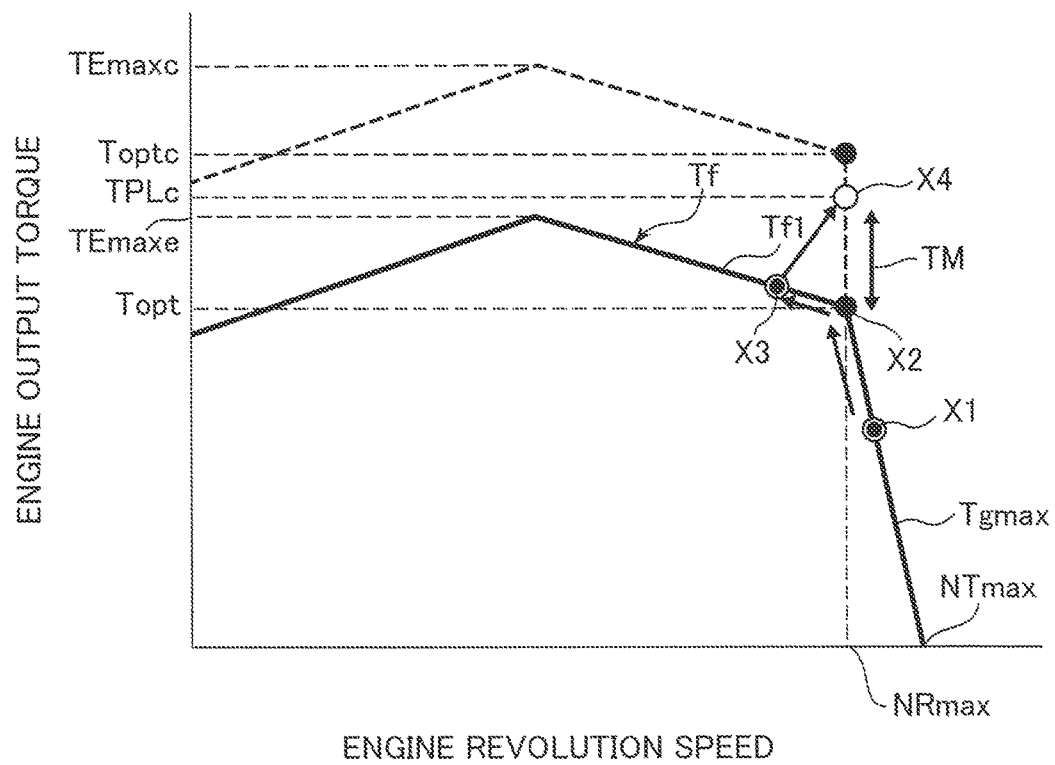
FIG. 13A is a graph illustrating changes in system output torque due to assistance control.
Figure 14A:
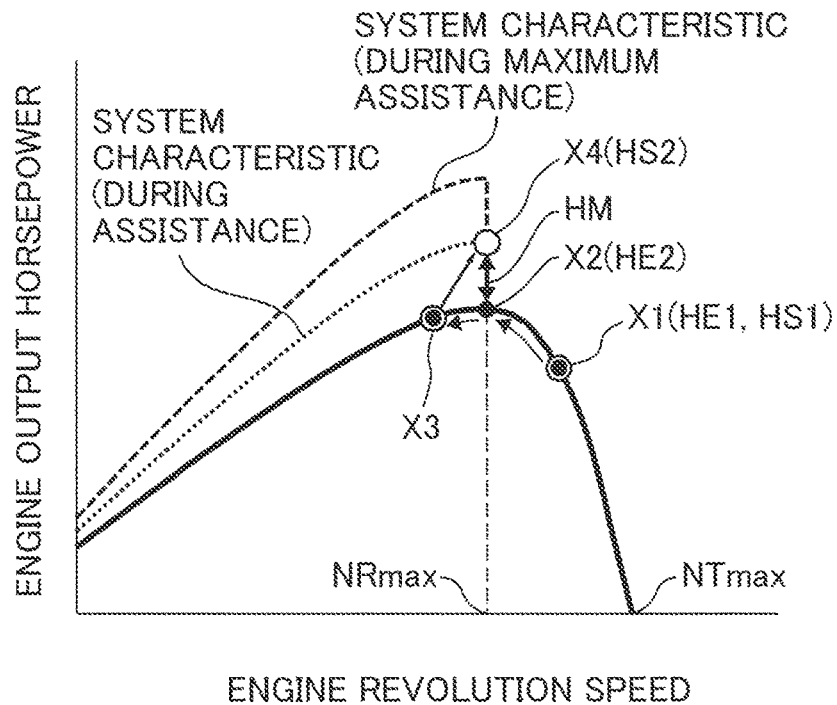
FIG. 14A is a graph illustrating changes in system output horsepower due to assistance control.
Figure 14B:
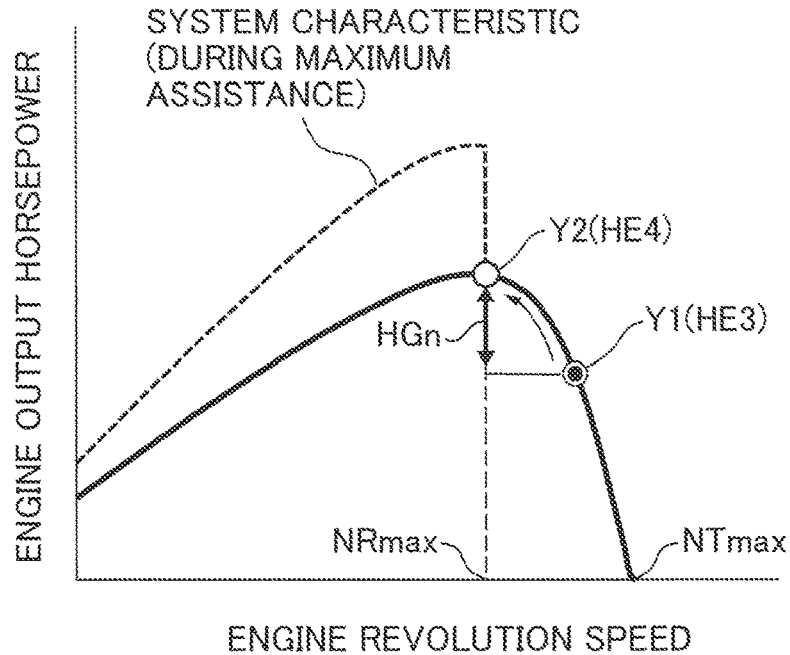
FIG. 14B is a graph illustrating changes in system output torque due to battery charge control.

The operation of the drive system of the present embodiment is described with reference to FIGS. 13A, 13B, 14A, and 14B. FIG. 13A is a graph illustrating changes in system output torque due to assistance control, where the horizontal axis represents engine revolution speed while the vertical axis represents output torque. FIG. 14A is a graph illustrating changes in system output horsepower due to assistance control, where the horizontal axis represents engine revolution speed while the vertical axis represents output horsepower. FIG. 13B is a graph illustrating changes in system output torque due to battery charge control, where the horizontal axis represents engine revolution speed while the vertical axis represents system output torque. FIG. 14B is a graph illustrating changes in engine output horsepower due to battery charge control, where the horizontal axis represents engine revolution speed while the vertical axis represents engine output horsepower.

In FIG. 13A, the reference symbol X1 represents the operating point of the engine 11 at which charge control is not performed with the battery charge rate being equal to or greater than 50% (no to step S100) and at which only the output torque of the engine 11 is used to cover the absorption torque (load torque) of the hydraulic pump 21 with the engine revolution speed being equal to or greater than the rated revolution speed NRmax (NRx) (no to step S160). As the absorption torque of the hydraulic pump 21 increases from the above state up to the maximum absorption torque TPLc, the operating point of the hybrid drive system in which the engine 11 is used in combination with the generator-motor 31 shifts from X1 through X2 and X3 to X4.

First, when the load torque of the engine 11 increases and the engine revolution speed decreases to the rated revolution speed NRmax, the fuel injection amount reaches the maximum Fmax (FIG. 3), and the output torque of the engine 11 increases up to the rated torque Topt (operating point X2). When the revolution speed of the engine 11 decreases further, the generator-motor 31 is operated as a motor (yes to step S160, followed by step S140), and control is performed such that the engine revolution speed is maintained at the rated revolution speed NRmax. Note that the system output torque is the sum of the rated torque Topt of the engine 11 and the output torque TM of the generator-motor 31. At this time, due to delay of assistance control, the revolution speed of the engine 11 decreases temporarily from the rated revolution speed NRmax (operating point 3). When the generator-motor 31 begins to operate, the revolution speed of the engine 11 increases and returns to the rated revolution speed NRmax (operating point X4).

In FIG. 14A, the operating points of the engine output horsepower and system output horsepower also shift from X1 through X2 and X3 to X4 in response to the above described changes in the output torque. The reference symbols HE1 an HS1 represent the engine output horsepower and system output horsepower at the operating point X1, both of which are equal. The reference symbols HE2 and HS2 represent the engine output horsepower and system output horsepower at the operating points X2 and X4, respectively. At the operating point X4, the engine output horsepower HE2 is the maximum horsepower, and the system output horsepower HS2 is the sum power of the engine output horsepower HE2 (maximum horsepower) and the output horsepower HM of the motor 31.

In FIG. 13B, the reference symbol Y1 represents the operating point of the engine 11 at which, similar to the operating point X1 of FIG. 13A, charge control is not performed with the battery charge rate being equal to or greater than 50% (no to step S100) and at which only the output torque of the engine 11 is used to cover the absorption torque (load torque) of the hydraulic pump 21 with the engine revolution speed being equal to or greater than the rated revolution speed NRmax (NRx) (no to step S160). If the battery charge rate decreases from the above state to fall below 50% (yes to step S100), the operating point of the engine 11 shifts from Y1 to Y2. That is, since the engine revolution speed at this time is equal to or greater than the rated revolution speed NRmax (NRx) and the engine 11 has surplus torque TGn, this surplus torque TGn is used to operate the generator-motor 31 as a generator, thereby performing charge control to charge the battery 33 (operating point Y2).

In FIG. 14B, the reference symbol HE3 represents the engine output horsepower at the operating point Y1. The reference symbol HE4 represents the engine output horsepower obtained when battery charge control is performed at the operating point Y2. At this time, the engine output horsepower HE4 is the maximum horsepower, and the difference HGn between HE3 and HE4 is the charging horsepower.

Next described with reference to FIGS. 15A through 16B is the operation of the second charge control when the charge rate of the battery 33 falls below the minimum charge rate (SOC).

Figure 15A:
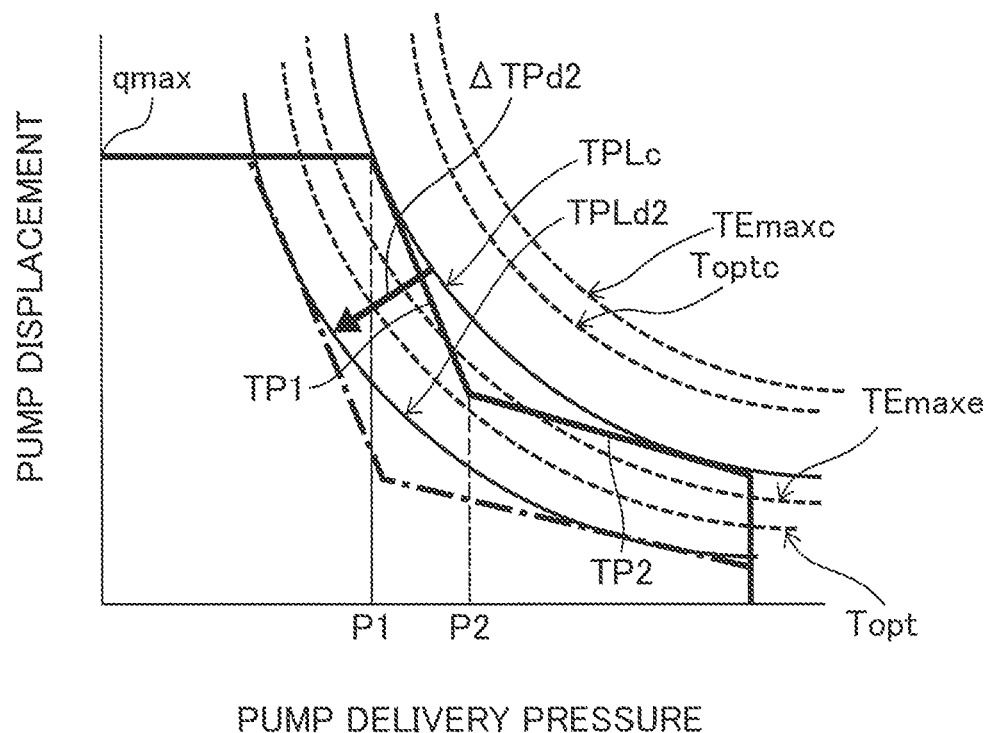
FIG. 15A is a graph illustrating, as a comparative example, a change in the maximum absorption torque of a hydraulic pump (reduced torque amount) when only pump torque reducing control is performed for rapid charge control.
Figure 15B:
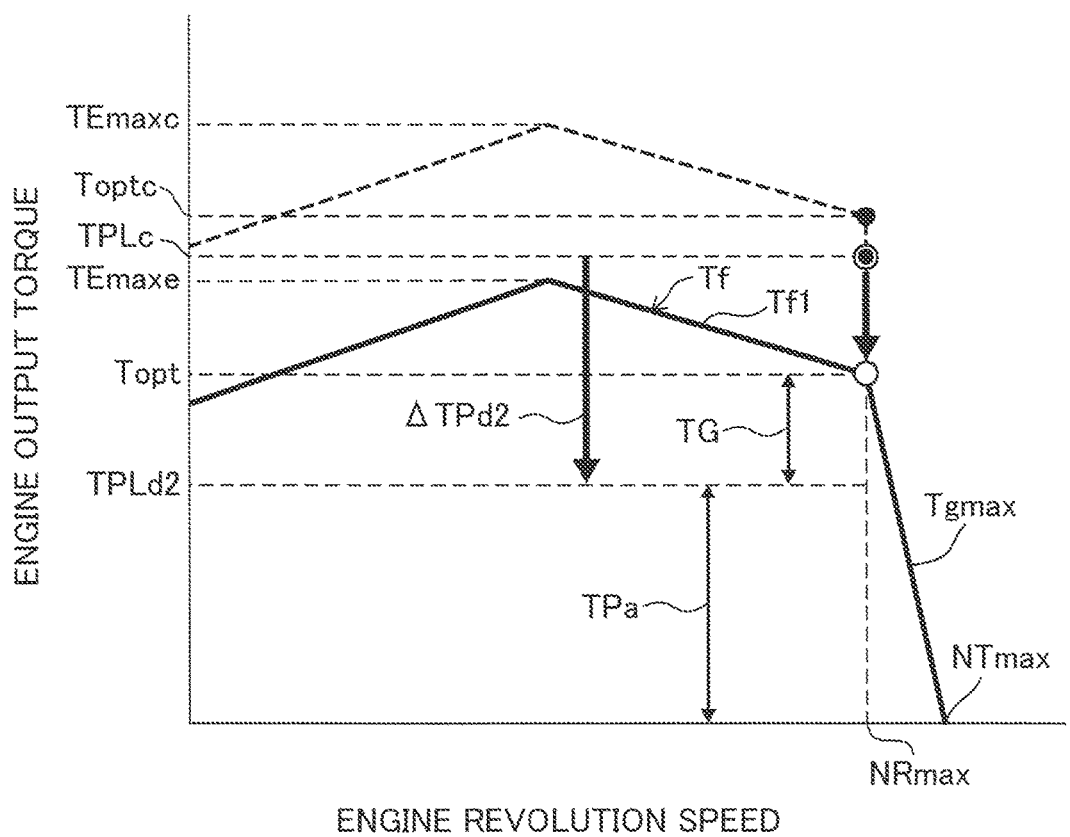
FIG. 15B is a graph illustrating a reduced torque amount when only the pump torque reducing control is performed for the rapid charge control and the allocation of the surplus torque of an engine, which is used as power generating torque for rapid charging of a battery, and the maximum torque usable for work.

FIG. 15A is a graph illustrating as a comparative example a change in the maximum absorption torque of the hydraulic pump 21 (reduced torque amount) when only the pump torque reducing control is performed for the rapid charge control. FIG. 15B is a graph illustrating a reduced torque amount when only the pump torque reducing control is performed for the rapid charge control and the allocation of the surplus torque of the engine 11, which is used as power generating torque for rapid charging of the battery 33, and the maximum torque usable for work.

In FIG. 15A, when a control signal is input to the torque control solenoid valve 44, the maximum absorption torque of the hydraulic pump 21 decreases from TPLc to TPLd2, the reduced torque amount at this time is represented by the bold arrow ΔTPd2.

In FIG. 15B, the reference symbol TG represents the surplus torque of the engine 11, which is used as power generating torque for rapid charging of the battery 33, while the reference symbol TPa represents the maximum torque amount that is usable for work when the engine revolution speed decreasing control is not performed.

In the comparative example, since the engine revolution speed decreasing control is not performed, the maximum target revolution speed stays at NRmax. In this case, the maximum horsepower revolution speed (rated revolution speed) of the engine 11 is NRmax, and the output torque of the engine 11 at this time is Topt. The maximum absorption torque TPLd2 after the torque reducing control needs to be equal to the torque amount that is obtained by subtracting the surplus torque TG, used as power generating torque, from the output torque Topt of the engine 11, and that maximum absorption torque TPLd2 (TPa obtained by subtracting TG from Topt) is the maximum torque amount that is usable for work.

FIG. 16A is a graph illustrating a change in the maximum absorption torque of the hydraulic pump 21 (reduced torque amount) when, as in the present embodiment, both the engine revolution speed decreasing control and the pump torque reducing control are performed for the rapid charge control. FIG. 16A is obtained by adding to FIG. 6 the output torque Topt1 at the maximum horsepower revolution speed after the engine revolution speed decreasing control has been performed on the engine 11. FIG. 16B is a graph illustrating the reduced torque amount required in the present embodiment and the allocation of the surplus torque of the engine 11 and the maximum torque usable for work.

In the present embodiment, since the engine revolution speed decreasing control is also performed, the maximum target revolution speed decreases to NTc, and the output torque of the engine 11 at the maximum horsepower revolution speed increases from Topt to Topt1. In this case, the maximum absorption torque TPLd1 after the torque reducing control can be made equal to the torque amount that is obtained by subtracting the surplus torque TG, used as power generating torque, from the increased output torque Topt1 of the engine 11, and that maximum absorption torque TPLd1 (TPb obtained by subtracting TG from Topt1) is the maximum torque amount usable for work. This maximum work torque amount TPb (the maximum absorption torque TPLd1 after the torque reducing control) increases in proportion to the output torque increased from Topt to Topt1 at the maximum horsepower revolution speed of the engine 11.

In the foregoing comparative example in which only the pump torque reducing control is performed for the rapid charge control, the reduced torque amount ΔTPd2, or a decrease amount in the maximum absorption torque, is larger. Thus, during rapid charging, the output power of the hydraulic pump decreases considerably, which may cause trouble for work, such as excavation work, that requires high-load torque. In the present embodiment, by contrast, the engine output torque increases from Topt to Topt1 by the engine revolution speed decreasing control, and the reduced torque amount ΔTPd1 becomes smaller by that extent. Thus, the decrease amount in the maximum absorption torque of the hydraulic pump 21 is smaller than that in the comparative example, and the maximum work torque TPb is larger than its counterpart in the comparative example. Moreover, when work is done during rapid charging, the operation amount can be prevented from decreasing.

Advantageous Effects

As stated above, in the present embodiment, by reducing the demanded torque of the engine 11 by power assistance, the engine 11 can be miniaturized, which in turn improves fuel consumption, improves exhaust characteristics, and reduces noise.

In addition, when the charge rate of the battery 33 falls below the minimum charge rate, the engine revolution speed decreasing control is performed to reduce the engine revolution speed, which increases the engine output torque Topt1 on the entire load characteristic segment Tf1 of the engine 11 at the maximum horsepower revolution speed NRc. This reduces the decrease in the maximum absorption torque of the hydraulic pump 21 resulting from the torque reducing control, compared with the case in which only the torque reducing control is performed to produce surplus torque. It is also possible to perform rapid charging of the battery 33 while controlling decreases in the output power of the hydraulic pump 21 (decreases in the operation amount of the hydraulic excavator). Consequently, a certain amount of work can be performed even during charging of the battery 33, thus preventing decreases in the operating efficiency of the machine body.

Further, as stated above, in a small-sized hydraulic excavator such as a mini-excavator, the output power of the hydraulic pump 21 is smaller in the normal operation C than in the high-speed travel A. Thus, even in the case where the engine 11 is downsized such that the rated torque Topt or the maximum torque TEmaxe is smaller than the maximum absorption torque TPLc of the hydraulic pump 21, output power lower than the rated torque Topt of the engine 11 is often enough to cover the output power of the hydraulic pump 21 during the normal operation C. In such a small-sized hydraulic excavator, by performing power assistance control when the engine revolution speed is lower than the rated revolution speed NRmax, that is, the maximum horsepower revolution speed, and by performing charge control when the engine revolution speed is higher than the rated revolution speed NRx, that is, the maximum horsepower revolution speed (i.e., when the engine 11 has surplus torque), the power assistance control needs to be performed less frequently, and the power consumption by the battery 33 can be suppressed. Also, the charge control can be performed more frequently on the battery 33 without decreasing work efficiency, and the charge amount of the battery 33 can thus be increased. As a result, in a small-sized construction machine, such as a mini-excavator, in which the electric power consumed by the battery cannot be recovered by the regenerative energy at the time of boom lowering or swing braking, the remaining charge amount of the battery 33 can be prevented from decreasing soon even if the battery 33 is miniaturized so as to be installed in a small space on the swing frame. This means that it is possible to reduce the frequency at which the charge rate of the battery 33 falls below the minimum charge rate, that is, the frequency of performing rapid charging. Therefore, work needs to be interrupted less frequently for the purpose of charging the battery 33, which prevents work efficiency decreases and also increases the operating rate of the machine body.

Modifications

In the foregoing embodiment, assistance control is selected to battery charge control and vice versa, by determining if the engine revolution speed is higher or lower than the maximum horsepower revolution speed NRx (or the rated revolution speed NRmax when the target revolution speed is the maximum NTmax). However, the maximum horsepower revolution speed NRx used for the determination can have a margin. That is, by taking into consideration engine revolution speed hunting and the like, a predetermined margin ΔN can be set. If the engine revolution speed exceeds the maximum horsepower revolution speed NRx+ΔN, the battery charge control can be performed. If, on the other hand, the engine revolution speed falls below the maximum horsepower revolution speed NRx−ΔN, the power assistance control can be performed. This stabilizes the control of the generator-motor 31 when the engine revolution speed is close to the maximum horsepower revolution speed NRx.

Also, although the foregoing embodiment has adopted, for the control of the electronic governor 14, the droop control in which engine revolution speed is reduced and the fuel injection amount is increased in proportion to engine load increases, the invention is not limited thereto. It is also possible to adopt isochronous control in which the fuel injection amount is adjusted such that the engine revolution speed is maintained at a constant value regardless of increases in engine load.

Figure 17A:
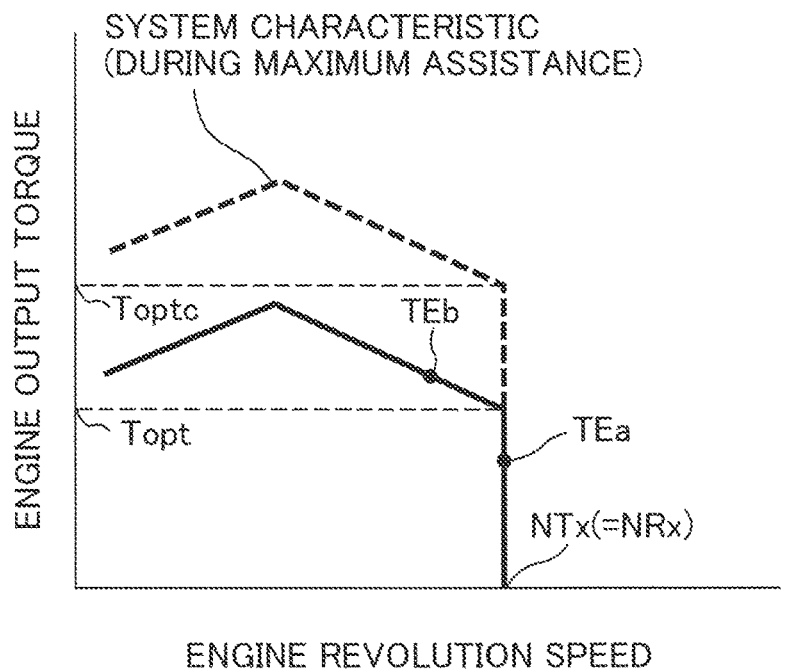
FIG. 17A is a graph illustrating the relation between engine revolution speed and engine output torque when isochronous control is employed.
Figure 17B:
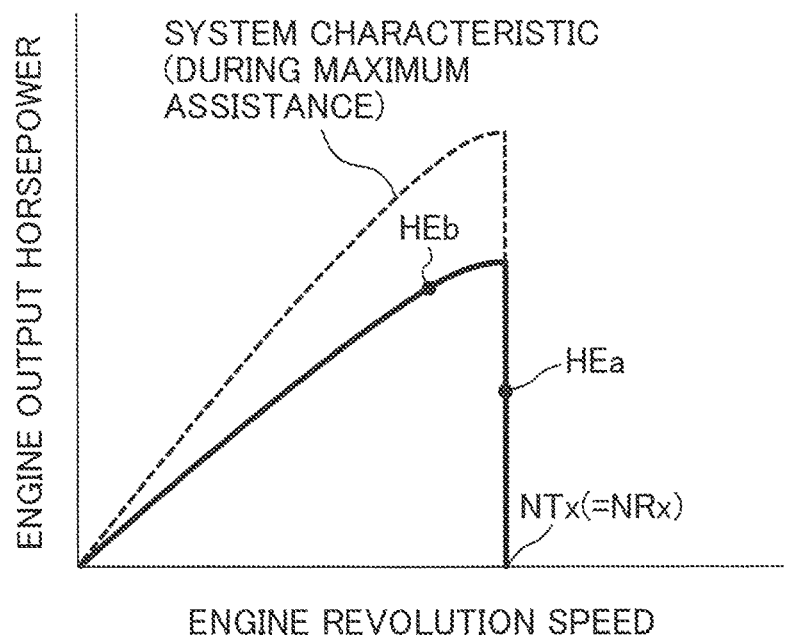
FIG. 17B is a graph illustrating the relation between engine revolution speed and engine output horsepower when isochronous control is employed.

FIG. 17A is a graph illustrating the relation between engine revolution speed and engine output torque when isochronous control is employed. FIG. 17B is a graph illustrating the relation between engine revolution speed and engine output horsepower when isochronous control is employed.

In FIG. 17A, when the output torque is smaller than the rated torque Topt (i.e. when the engine 11 has surplus torque), the engine revolution speed is maintained at the target revolution speed NTx (=maximum horsepower revolution speed NRx), as illustrated by the reference symbol TEa. When the revolution speed deviation output torque is larger than the rated torque Topt, the engine revolution speed becomes lower than the maximum horsepower revolution speed NRx, as illustrated by the reference symbol TEb. In FIG. 17B, on the other hand, when the output torque is smaller than the rated torque Topt (i.e. when the engine 11 has surplus torque), the engine revolution speed is maintained at the maximum horsepower revolution speed NRx, as illustrated by the reference symbol HEa. When the output torque is larger than the rated torque Topt, the engine revolution speed becomes lower than the maximum horsepower revolution speed NRx as illustrated by the reference symbol HEb, and the output horsepower becomes smaller than the maximum horsepower. The control (isochronous control) for maintaining the engine revolution speed at the target revolution speed NTx (=maximum horsepower revolution speed NRx) can be implemented by, for example, stopping fuel injection if the actual revolution speed is greater than NRx and performing fuel injection if the actual revolution speed is less than NRx, that is, by performing on/off control for fuel injection based on the maximum horsepower revolution speed NRx.

As described above, in the isochronous control, although the engine revolution speed changes when the engine 11 has surplus torque are different from those in the droop control, it is possible to determine whether power assistance is necessary by determining whether the engine revolution speed is lower than the maximum horsepower revolution speed NRx. Therefore, the invention can also be applied to cases where the isochronous control is adopted.

Moreover, while the hydraulic pump 21, the pilot pump 22, and the generator-motor 31 are coupled to the output shaft of the engine 11 via the power distribution device 6 in the foregoing embodiment, the invention is not limited thereto. Instead, those can be connected, for example, in parallel to the output shaft of the engine 11.

DESCRIPTION OF REFERENCE SYMBOLS

1: Engine system
2: Hydraulic system
3: Generator-motor system
4: Control system
6: Power distribution device
11: Engine
12: Engine control dial
13: Engine controller
14: Electronic governor (governor device)
15: Engine revolution speed detection device
21: Hydraulic pump
21a: Displacement varying mechanism
22: Pilot pump
23: Control valve 23a, 23b: Main spool for travel
24a, 24b: Hydraulic travel motor
24c to 24h: Other hydraulic actuators
24a1, 24b1: Displacement varying mechanism (swash plate)
24a2, 24b2: Control piston
24a3, 24a3: Pressure receiving section
24a4, 24b4: Spring
25: Operating device for travel
26: Other operating devices
27: Pump regulator
27a: Control spool
27b, 27c: First and second springs
27d, 27e: First and second pressure receiving sections
27f: Pilot line
27g: Hydraulic line
29: Main relief valve
31: Generator-motor
32: Inverter
33: Battery (power storage device)
34: Battery controller
35: Operating panel
41: Travel speed selecting switch
42: Pilot pressure sensor for travel
43: Other pilot pressure sensors
44: Torque control solenoid valve
45: Travel speed selecting solenoid valve
46: Vehicle body controller
46a: Travel control section
46b: State determining section
46c: Pump/engine control section (first control section)
46d: Generator-motor/battery control section (second control section)
101: Lower travel structure
102: Upper swing structure
103: Swing post
104: Front work implement
105: Track frame
106: Earth removal blade
107: Swing base
108: Cabin (operation room)
111: Boom
112: Arm
113: Bucket

The invention claimed is:

1. A hybrid work machine comprising:
an engine;
a hydraulic pump driven by the engine;
a plurality of actuators driven by the hydraulic fluid delivered from the hydraulic pump;
an engine revolution speed indication device for indicating a target revolution speed for the engine;
an engine revolution speed detection device for detecting the actual revolution speed of the engine;
a governor device for controlling a fuel injection amount such that an output torque of the engine increases as a load torque of the engine increases;
a generator-motor coupled to the engine;
a power storage device for supplying or receiving electric power to or from the generator-motor; and
a control device for performing a control of power assistance by supplying the electric power from the power storage device to the generator-motor and operating the generator-motor as a motor and a control of charging the power storage device by causing the engine to rotationally drive the generator-motor, operating the generator-motor as a generator and supplying the electric power to the power storage device, the control device being configured to perform, when a charge rate of the power storage device becomes equal to or less than a predetermined charge rate, a torque reducing control in which a maximum absorption torque of the hydraulic pump is reduced, thereby to generate surplus torque for the engine, operate the generator-motor as a generator and supply the electric power to the power storage device to charge the power storage device,
wherein the engine has an output torque characteristic including an entire load characteristic in which the fuel injection amount of the governor device is maximum and a regulation characteristic in which the fuel injection amount of the governor device increases up to maximum, the entire load characteristic including: a first characteristic segment in which, as an engine revolution speed detected by the engine revolution speed detection device decreases from a rated revolution speed to a predetermined revolution speed, the output torque of the engine increases and the output torque of the engine becomes maximum at the predetermined revolution speed; and a second characteristic segment in which, as the engine revolution speed decreases from the predetermined revolution speed, the output torque of the engine decreases, and
wherein the control device is configured to perform engine revolution speed decreasing control in addition to the torque reducing control when the charge rate of the power storage device becomes equal to or less than the predetermined charge rate, the engine revolution speed decreasing control being such that the target revolution speed of the engine is decreased to cause increase of the output torque of the engine, thereby to generate a further surplus torque for the engine and operate the generator-motor as a generator with use of the surplus torque generated for the engine by the engine revolution speed decreasing control, and supply the electric power to the power storage device to charge the power storage device.

2. The hybrid work machine of claim 1, wherein the output torque characteristic of the engine is set such that a rated torque of the engine, which is the output torque when the engine revolution speed is at the rated revolution speed, is smaller than the maximum absorption torque of the hydraulic pump and such that the maximum absorption torque of the hydraulic pump cannot be covered by the output torque of the engine alone.

3. The hybrid work machine of claim 1, wherein the output torque characteristic of the engine is set such that a maximum torque of the engine is smaller than the maximum absorption torque of the hydraulic pump and such that the maximum absorption torque of the hydraulic pump cannot be covered by the output torque of the engine alone.

* * * * *